US011929582B2

(12) United States Patent
Pachoud et al.

(10) Patent No.: US 11,929,582 B2
(45) Date of Patent: Mar. 12, 2024

(54) RELAY CONDITIONING AND POWER SURGE CONTROL

(71) Applicant: Zonit Structured Solutions, LLC, Boulder, CO (US)

(72) Inventors: William Pachoud, Boulder, CO (US); Steve Chapel, Iliff, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 461 days.

(21) Appl. No.: 16/817,504

(22) Filed: Mar. 12, 2020

(65) Prior Publication Data
US 2021/0006020 A1    Jan. 7, 2021

Related U.S. Application Data

(60) Provisional application No. 62/817,456, filed on Mar. 12, 2019.

(51) Int. Cl.
*H01R 29/00* (2006.01)
*H01R 13/703* (2006.01)
(Continued)

(52) U.S. Cl.
CPC ......... *H01R 29/00* (2013.01); *H01R 13/7038* (2013.01); *H01R 25/003* (2013.01); *H02J 9/06* (2013.01); *H01H 2300/018* (2013.01)

(58) Field of Classification Search
CPC .. H01R 29/00; H01R 13/7038; H01R 25/003; H02J 9/06; H01H 2300/018
See application file for complete search history.

(56) References Cited

U.S. PATENT DOCUMENTS 4,721,475 A    1/1988    Burke, Jr.
5,352,132 A    10/1994   O'Keefe et al.
(Continued)

FOREIGN PATENT DOCUMENTS

CN    112136369 A    12/2020
EP    2483977 A1     8/2012
(Continued)

OTHER PUBLICATIONS

International Search Report and Written Opinion issued in co-pending International Application No. PCT/US2019/021936, dated Aug. 2, 2019.
(Continued)

*Primary Examiner* — Carlos Amaya
(74) *Attorney, Agent, or Firm* — Davis Graham & Stubbs LLP

(57) ABSTRACT

A system is provided for suppressing transient currents in electrical circuits to prevent damage to switching devices such as relays and/or solid-state switching devices. An associated automatic transfer switch (ATS) system (300) includes a primary power cord terminating in cord cap (302) for receiving power from a primary power source and a secondary power cord terminating in cord cap (304) for receiving power from a secondary power source. The system (300) further includes an output (306) for connecting to an output load such as a piece of electronic equipment. The output (306) may be a female outlet such that the system (300) can be directly connected to a male power port of a piece of equipment. The system (300) further includes a micro-ATS module (308) operative to sense a power outage or degradation of signal quality for the power signal of at least the primary power source and, in response, to switch the power supply from the primary source to the secondary power source. A surge suppression circuit (310) is interposed
(Continued)

in the secondary power cord between the module (308) and the cord cap (304).

16 Claims, 24 Drawing Sheets

(51) Int. Cl.
*H01R 25/00* (2006.01)
*H02J 9/06* (2006.01)

(56) References Cited

U.S. PATENT DOCUMENTS

| | | | |
|---|---|---|---|
| 5,507,664 | A | 4/1996 | Carmo |
| 6,341,972 | B1 | 1/2002 | Odofer |
| 6,628,009 | B1 | 9/2003 | Chapel |
| 7,172,451 | B1 | 2/2007 | Ratzlaff |
| 7,553,181 | B1 | 6/2009 | Van Dalinda, III |
| 8,004,115 | B2 | 8/2011 | Chapel et al. |
| 8,152,554 | B2 | 4/2012 | Chapel et al. |
| 8,174,149 | B2 | 5/2012 | Chapel et al. |
| 8,374,729 | B2 | 2/2013 | Chapel et al. |
| 8,453,471 | B2 | 6/2013 | Chapel et al. |
| 8,476,540 | B2 | 7/2013 | Dahl et al. |
| 8,729,730 | B2 | 5/2014 | Lathrop |
| 8,907,520 | B2 | 12/2014 | Chapel et al. |
| 9,065,207 | B2 | 6/2015 | Chapel et al. |
| 9,081,568 | B1 | 7/2015 | Ross et al. |
| 9,160,168 | B2 | 10/2015 | Chapel et al. |
| 9,281,617 | B2 | 3/2016 | Reaves et al. |
| 9,431,763 | B2 | 8/2016 | Chapel et al. |
| 9,537,341 | B2 | 1/2017 | Lee |
| 9,588,534 | B2 | 3/2017 | Chapel et al. |
| 9,601,284 | B2 | 3/2017 | Chapel et al. |
| 9,618,270 | B2 | 4/2017 | Chapel et al. |
| 9,646,789 | B2 | 5/2017 | Chapel et al. |
| 9,658,665 | B2 | 5/2017 | Chapel et al. |
| 9,793,887 | B2 | 10/2017 | Chapel et al. |
| 9,829,960 | B2 | 11/2017 | Pachoud et al. |
| 9,918,413 | B2 | 3/2018 | Chapel et al. |
| 9,935,495 | B2 | 4/2018 | Thurk et al. |
| 9,958,925 | B2 | 5/2018 | Chapel et al. |
| 9,996,128 | B2 | 6/2018 | Chapel et al. |
| 9,997,957 | B2 | 6/2018 | Chapel et al. |
| 10,034,406 | B2 | 7/2018 | Chapel et al. |
| 10,050,441 | B2 | 8/2018 | Chapel et al. |
| 10,068,730 | B2 | 9/2018 | Chapel et al. |
| 10,088,883 | B2 | 10/2018 | Cohen |
| 10,209,727 | B2 | 2/2019 | Chapel et al. |
| 10,297,958 | B2 | 5/2019 | Chapel et al. |
| 10,326,240 | B2 | 6/2019 | Chapel et al. |
| 10,361,050 | B2 | 7/2019 | Chapel et al. |
| 10,474,220 | B2 | 11/2019 | Pachoud et al. |
| 10,673,429 | B2 | 6/2020 | Chapel et al. |
| 10,698,469 | B2 | 6/2020 | Chapel et al. |
| 10,945,351 | B2 | 3/2021 | Chapel et al. |
| 11,085,714 | B2 | 8/2021 | Doll et al. |
| 11,289,844 | B2 | 3/2022 | Pachoud et al. |
| 2003/0117761 | A1 | 6/2003 | Pebles et al. |
| 2007/0187343 | A1 | 8/2007 | Colucci et al. |
| 2008/0236863 | A1 | 10/2008 | Keeven et al. |
| 2008/0258556 | A1 | 10/2008 | Ewing et al. |
| 2008/0313006 | A1 | 12/2008 | Witter et al. |
| 2010/0068913 | A1 | 3/2010 | Edge et al. |
| 2010/0141038 | A1* | 6/2010 | Chapel ............... H01R 25/003 307/64 |
| 2010/0144187 | A1 | 6/2010 | Chapel et al. |
| 2010/0197156 | A1 | 8/2010 | Chen |
| 2011/0169531 | A1 | 7/2011 | Scholder |
| 2011/0207362 | A1 | 8/2011 | Lifson |
| 2012/0092811 | A1 | 4/2012 | Chapel et al. |
| 2012/0095610 | A1 | 4/2012 | Chapel et al. |
| 2012/0181869 | A1 | 7/2012 | Chapel et al. |
| 2012/0204418 | A1 | 8/2012 | Van Beveren et al. |
| 2013/0093249 | A1 | 4/2013 | Chapel et al. |
| 2014/0025221 | A1 | 1/2014 | Chapel et al. |
| 2015/0200509 | A1 | 7/2015 | Chapel et al. |
| 2016/0036269 | A1 | 2/2016 | Yoshida |
| 2016/0118802 | A1 | 4/2016 | Castillo et al. |
| 2016/0195911 | A1 | 7/2016 | Chapel et al. |
| 2017/0005510 | A1 | 1/2017 | Rohr et al. |
| 2017/0207576 | A1 | 7/2017 | Chapel et al. |
| 2017/0279267 | A1* | 9/2017 | Cheng ............... H02M 1/10 |
| 2017/0308109 | A1 | 10/2017 | Chapel et al. |
| 2018/0278086 | A1 | 9/2018 | Hall et al. |
| 2018/0375268 | A1 | 12/2018 | Chapel et al. |
| 2021/0006020 | A1 | 1/2021 | Pachoud et al. |
| 2021/0013735 | A1 | 1/2021 | Pachoud et al. |

FOREIGN PATENT DOCUMENTS

| | | |
|---|---|---|
| EP | 2483977 B1 | 11/2014 |
| EP | 2973881 A1 | 1/2016 |
| EP | 3766315 A1 | 1/2021 |
| JP | H06181078 A | 6/1994 |
| JP | 4152242 B2 | 9/2008 |
| WO | 2008113047 A2 | 9/2009 |
| WO | 2009120880 | 10/2009 |
| WO | 2013/095352 A1 | 6/2013 |
| WO | 2014/134218 A1 | 9/2014 |
| WO | 2014134218 A1 | 9/2014 |
| WO | 2015148686 | 10/2015 |

OTHER PUBLICATIONS

International Search Report and Written Opinion issued in co-pending International Application No. PCT/US2020/024345, dated Jul. 13, 2020.
Prosecution History of co-pending U.S. Appl. No. 16/824,554, dated Mar. 30, 2021 through Jul. 30, 2021.
U.S. Appl. No. 12/531,212, by Chapel, filed Sep. 14, 2009.
U.S. Appl. No. 12/531,231, by Chapel, filed Sep. 14, 2009.
U.S. Appl. No. 12/531,235, by Chapel et al., filed Sep. 14, 2009.
U.S. Appl. No. 12/531,240, by Chapel, filed Sep. 14, 2009.
U.S. Appl. No. 12/892,500, by Chapel et al., filed Sep. 27, 2010.
U.S. Appl. No. 12/892,009, by Chapel et al., filed Sep. 28, 2010.
U.S. Appl. No. 15/064,368, By Chapel et al., filed Mar. 8, 2016.
International Search Report and Written Opinion issued in International Application No. PCT/US2020/022487 dated Sep. 21, 2020, 11 pp.
International Search Report and Written Opinion issued in co-pending International Application No. PCT/US2019/021936, Korean Intellectual Property Office, dated Aug. 2, 2019, 13 pages.
Non-Final Office Action, dated Jul. 11, 2022, issued in related U.S. Appl. No. 16/905,846.
Examination Report under sections 12 & 13 of the Patents Act, 1970 and the Patents Rules, 2003, dated Jul. 28, 2022, issued in related IN Application No. 202017041133.
Office Action, dated Oct. 28, 2022, issued in related CA Application No. 3,133,279.
Extended European Search Report, dated Nov. 8, 2022, issued in related EP Application No. 20772758.7.
Non-Final Office Action, dated Nov. 10, 2022, issued in related U.S. Appl. No. 16/905,822.
Office Action, dated Nov. 14, 2022, issued in related CA Application No. 3,134,050.
Non-Final Office Action, dated Nov. 23, 2022, issued in related U.S. Appl. No. 17/707,862.
Communication pursuant to Rules 70(2) and 70a(2) EPC, dated Nov. 25, 2022, issued in related EP Application No. 20772758.7.
Extended European Search Report, dated Nov. 29, 2022, issued in related EP Application No. 20769754.1.
Final Office Action, dated Dec. 5, 2022, issued in related U.S. Appl. No. 17/093,485.
Final Office Action, dated Dec. 7, 2022, issued in related U.S. Appl. No. 16/905,846.

* cited by examiner

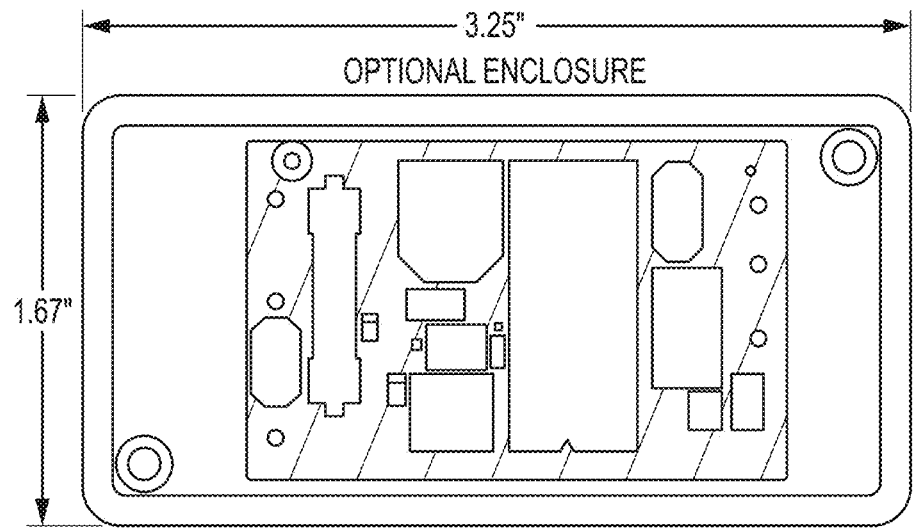
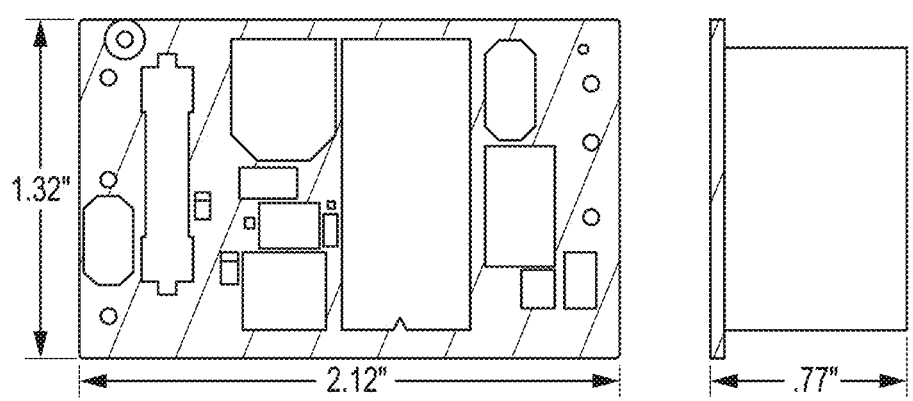
FIG.10C

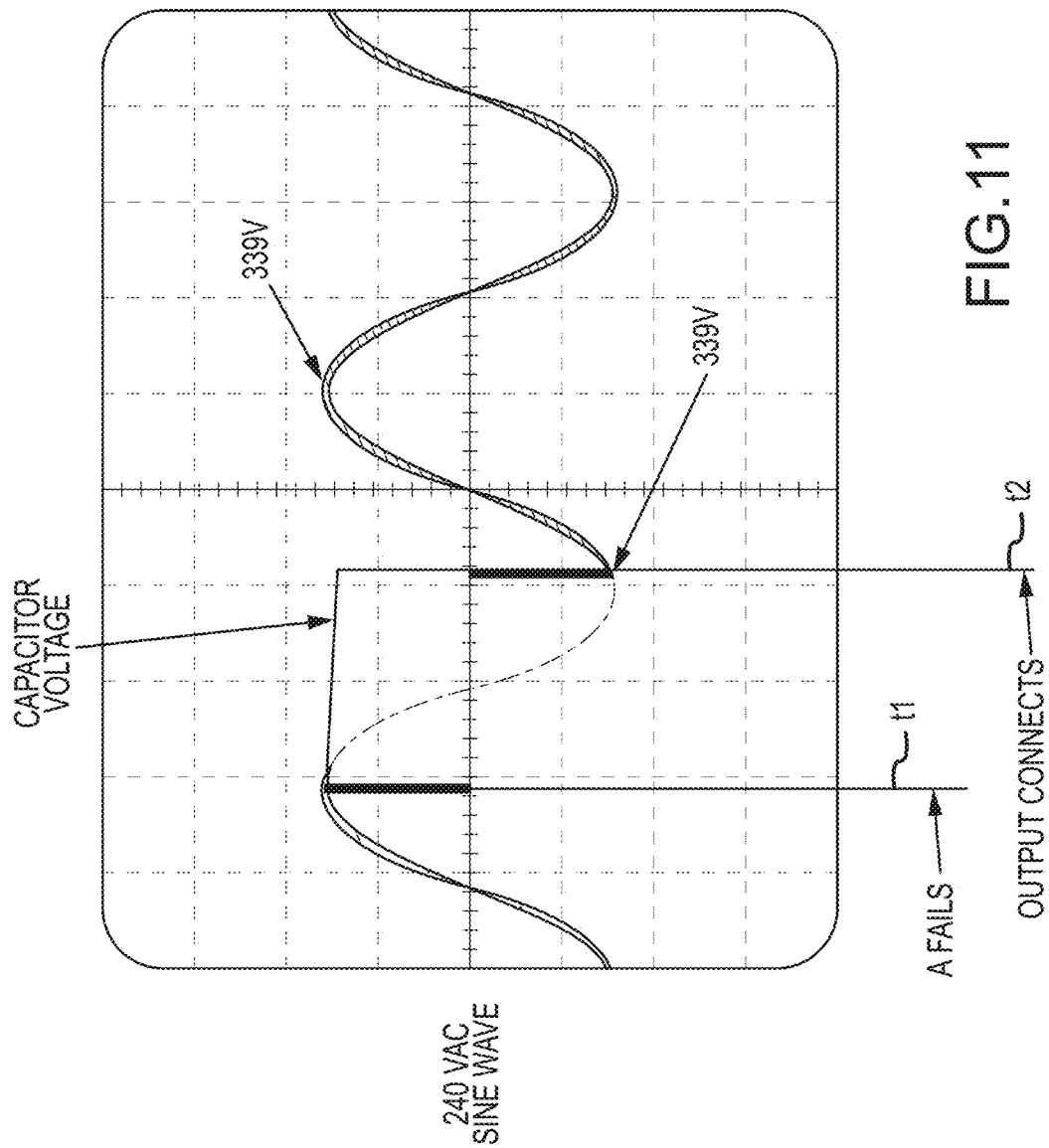

RELAY CONDITIONING AND POWER SURGE CONTROL

CROSS-REFERENCES

This application claims priority from provisional U.S. Patent Application No. 62/817,456 entitled, "RELAY CONDITIONING AND POWER SURGE CONTROL," filed Mar. 12, 2019 (the "Parent Application") and claims priority from the Parent Application to the maximum extent permissible under applicable laws and regulations. The Parent Application is incorporated by reference herein in its entirety.

INCORPORATED DOCUMENTS

The following applications (hereinafter "incorporated documents") are incorporated by reference herein in their entireties:

1) U.S. Provisional Patent Application No. 61/372,752, filed Feb. 26, 2013, entitled "HIGHLY PARALLEL REDUNDANT POWER DISTRIBUTION METHODS;"
2) U.S. Patent Application Publication No. US-2012/0181869-A1, published on Jul. 19, 2012, entitled, "PARALLEL REDUNDANT POWER DISTRIBUTION," U.S. patent application Ser. No. 13/208,333, ("the '333 Application") filed on Aug. 11, 2011, entitled, "PARALLEL REDUNDANT POWER DISTRIBUTION," which is a nonprovisional of and claims priority from U.S. Provisional Patent Application No. 61/372,752, filed Aug. 11, 2010, entitled "HIGHLY PARALLEL REDUNDANT POWER DISTRIBUTION METHODS," and U.S. Provisional Patent Application No. 61/372,756, filed Aug. 11, 2010, entitled "REDUNDANT POWER DISTRIBUTION,"
3) U.S. Pat. No. 8,004,115 from U.S. patent application Ser. No. 12/569,733, filed Sep. 29, 2009, entitled AUTOMATIC TRANSFER SWITCH MODULE, which—is a continuation-in-part of U.S. patent Ser. No. 12/531,212, filed on Sep. 14, 2009, entitled "AUTOMATIC TRANSFER SWITCH,", which is the U.S. National Stage of PCT Application US2008/57140, filed on Mar. 14, 2008, entitled "AUTOMATIC TRANSFER SWITCH MODULE," which claims priority from U.S. Provisional Application No. 60/894,842, filed on Mar. 14, 2007, entitled "AUTOMATIC TRANSFER SWITCH MODULE;" and
4) U.S. Patent Application Publication No. US-2012-0092811 for U.S. patent application Ser. No. 13/108,824, filed on May 16, 2011, entitled "POWER DISTRIBUTION SYSTEMS AND METHODOLOGY," is a continuation of U.S. patent application Ser. No. 12/891,500, filed on Sep. 27, 2010, entitled, "POWER DISTRIBUTION METHODOLOGY," which is a continuation-in-part of International Patent Application No. PCT/US2009/038427, filed on Mar. 26, 2009, entitled, "POWER DISTRIBUTION SYSTEMS AND METHODOLOGY," which claims priority from U.S. Provisional Application No. 61/039,716, filed on Mar. 26, 2008, entitled, "POWER DISTRIBUTION METHODOLOGY."
5) U.S. Pat. No. 8,374,729, from U.S. patent application Ser. No. 12/569,377, entitled, "SMART ELECTRICAL OUTLETS AND ASSOCIATED NETWORKS," filed Sep. 29, 2009, which is a continuation of U.S. patent application Ser. No. 12/531,226, entitled, "SMART ELECTRICAL OUTLETS AND ASSOCIATED NETWORKS," filed on Feb. 16, 2010, which is the U.S. National Stage of PCT/US2008/057150, entitled, "SMART NEMA OUTLETS AND ASSOCIATED NETWORKS," filed on Mar. 14, 2008, which in turn claims priority to U.S. Provisional Application No. 60/894,846, entitled, "SMART NEMA OUTLETS AND ASSOCIATED NETWORKS," filed on Mar. 14, 2007.

FIELD

Embodiments of the present invention relate to the design and operation of transfer switches connected to AC powered equipment. There are many uses for such a device; we note uses of the present invention that relate generally to electrical power distribution circuits and control aspects of the operation of the circuit and/or a connected automatic transfer switch (ATS) device. The invention also has application to the design and operation of power distribution devices, for example, manual or automatic transfer switches (ATS) and, in particular, to devices used in mission critical environments such as medical contexts, the power utility grid or in data center or telecommunications environments.

BACKGROUND

Recently OEM AC to DC power supply manufacturers have introduced to the market power supplies—often used for electronic data processing (EDP) equipment—) that have an unusually large capacitance directly connected across the AC mains, to construct a low-pass common mode filter, which is designed to capture any high-order ringing energy going into or coming out of the AC to DC power supply on the AC line. This is done to minimize cost and achieve FCC certifications. In more traditional power supply design practice, a relatively small inductor is placed between the matched size filter capacitor and the AC mains to control the exposure of the AC mains to discharge of that capacitor directly applied across the AC mains. However, the manufacturers of those power supplies have found it is cheaper to add a relatively large capacitor across the AC main and use cheaper and noiser parts in the power supply and also to not increase the capacity of the inductor (the more expensive part) to match the larger capacity of the filter capacitor. The downside of this approach is that under certain conditions the energy stored in the capacitor can be discharged quickly down the AC line and cause high transient currents.

These unusual power supplies with excess capacitance have capacitors that are up to 10× or more the size of previous designs. This is not good design practice, but there are no electrical design or safety standards that regulate this design practice.

SUMMARY OF THE INVENTION

The present inventors have recognized that these unusual power supplies with excess capacitance can cause a problem when transferring the AC from one source to another rapidly, such as in a manual or automatic transfer switch (ATS). If the AC line on the primary (A side in this example) disconnects at or near the peak of the AC cycle, the filter capacitor will be charged to that voltage. If, by chance, the ATS then transfers the load to the alternate power source (B side in this example) and it is in an opposite half cycle, or close to that in voltage state, the capacitor on the input of the equipment load may be connected to a low impedance voltage source of significant reverse polarity to the polarity of which it is charged. In this case, the capacitor may be charged to as much as 300 volts positive, and the opposing voltage on the transferred to source may be as much as 350 volts negative (or vise-versa); the resultant discharge is as much as 650 to 700 Volts at 1 to 3 micro-Farads. Considering the average resistance of most loads, this would not be a problem, the energy of the current would be absorbed without damage, but often the failover side of the ATS is connected to low impedance plugstrips which have multiple pieces of EDP equipment on them. Those pieces of EDP equipment often have the same input protection capacitors on them, reducing the instantaneous impedance to very low values. Thus, very high currents can be experienced at that instant when the relay contacts or thyristor first close on the ATS connected to the power supply in question. The results measured recently in laboratory tests indicate that short duration current flows of 250 Amps or more are easily attained, and this has the possibility of causing liquification of the part of the relay contact that is closest to the other relay contact. The transient current flow is so high that the effect across the contacts is very similar to an arc welder. This contact arcing can result in point micro-welding of the relay contacts or damage to solid-state switching components depending on the level and duration of the current flows and maximum voltage levels seen. The contact relays will then often stick upon re-solidifying causing a malfunction. The solid-state switching component can be damaged or catastrophically fail, and may actually emit smoke and/or catch on fire.

This issue can affect any relay based or solid-state based ATS, making them malfunction and/or fail. This can cause unintended downtime to occur for AC/DC powered equipment due to the ATS not working. This can cause serious problems if mission critical equipment goes down due to power delivery failing. It can be appreciated by the user that designers of EDP and other equipment types that are targeted for data center use often assume that the power quality in the data center is well controlled and of good quality. Therefore use of traditional methods to protect from transient power spikes is often limited and/or absent. The other problem with traditional methods are that they often are too big to be used in crowded data center cabinets with limited free space and form factor limited devices. The present invention provides a number of devices and methods to increase the odds or positively prevent ATS units or other devices from failing due to these conditions and meet the other constraints, such as form factor, energy efficiency, cost, etc. that data center and other environments often require.

Switching mechanisms for electrical connections currently are divided into solid-state based switching devices (triacs, etc.) that switch very fast but have the disadvantage of being inefficient, losing between approximately 0.5-2% of the power sent through them as heat, and mechanical based relays that switch much slower but are much more efficient with minimal heat loss. Many devices including ATS units use solid state switches and/or mechanical relays to control electricity with the advantages and drawbacks noted above. Regardless of the type of switch, solid-state or mechanical relay, in many applications, either or both transfer time and efficiency are important, and may be critical. ATS switches are available in the market that use one, the other or a combination of both switching technologies.

A key example is the design and management of power distribution in data centers because the power supplies used in modern Electronic Data Processing (EDP) equipment can often only tolerate very brief power interruptions. For example, the Computer and Business Equipment Manufacturers Association (CBEMA) guidelines used in power supply design recommend a maximum outage of 20 milliseconds or less. If the power delivery to the power supply is interrupted for longer than this, the EDP equipment being run will halt or reboot. Modern power supplies often only tolerate a maximum outage time of as low as approximately 12-14 milliseconds, we have measured and observed this in many past and current EDP devices.

This is a very important issue in the design of manual or automatic transfer switches (ATS), for switching between two or more power sources (e.g., due to power failures such as outages or power quality issues), as well as other power distribution devices used with EDP equipment. The number of modern devices that now incorporate embedded processor control is large and growing fast. Many of these devices do not have dual power supplies for a variety of reasons, such as cost or size. The programs running on these devices may incorporate algorithms that "learn" over time to improve the performance of the device. The data stored to do that may not be written to persistent data storage. In that case, it is common to use ATS units to insure that the connected devices run without any downtime. There are many other examples of devices incorporating electricity, where the speed and/or efficiency of the switching function is an important issue and reduction or elimination of vulnerability to these transient current and voltage issues would be of great benefit.

The present invention relates to reducing or eliminating the vulnerability of certain devices, especially automatic transfer switches to high transient currents and/or voltage events (well above the rated capacity of the relay and/or solid-state switching device used in the ATS) that can damage or destroy the connected ATS unit(s). In particular, the invention relates to providing apparatus and methods for reducing or eliminating the vulnerability of the connected ATS unit(s). This can be done by external devices that can be retrofitted to already deployed automatic transfer switches, or design and/or relay conditioning methods that can be integrated into ATS construction that reduce or eliminate the vulnerability of the ATS to the high transient current &/or voltage problem.

Data center cabinets are very crowded and therefore meeting form factor and space constraints can be a very important part of the invention. A contributing factor is that a limiting consideration in many ATS designs is that the size the relays which can be used is limited by the requirement to have the ATS switch fast enough. This means that the relay must actuate fast enough to accomplish the power transfer in the required timeframe to keep the connected equipment running without downtime caused by a power delivery interruption. Therefore, the design of the relay must have a contact gap, armature mass and coil that meet the actuation speed requirement. This means that the relay gap needs to be small enough and the armature mass (including the size of the attached contacts) low enough to achieve the actuation speed necessary.

These required characteristics limit the ability of the relay to absorb energy and thus its ability to tolerate these high transient current and/or voltage events without damage or destruction. Silicon based switching devices also have limits on the energy they can absorb from high transient current and/or voltage events without damage or destruction. A further complicating factor is that relays and solid-state switching devices that have more tolerance to high current and/or voltage events are often larger and therefore may not fit in the space available in the desired application. Other solutions such as the use of inductors, chokes or other traditional methods for addressing surge currents also are often too large to fit in the space a particular application requires.

Some of the objectives of the invention include the following:

Providing apparatus, designs and methods to reduce or eliminate the vulnerability of ATS units or other vulnerable devices to high transient current and/or voltage events in the required form factors and space and cost limitations. The apparatus, designs and methods are able to be implemented as a retrofit solution to existing ATS installations and/or devices or be an upgrade to the design of current and future ATS devices or other devices that can be used to reduce or eliminate the issue.

These objectives and others are addressed in accordance with the present invention by providing various systems, components, designs and processes for improving ATS function. Many aspects of the invention, as discussed below, are applicable in a variety of contexts. However, the invention has particular advantages in connection with data center applications. In this regard, the invention provides considerable flexibility in dealing with the issue of high transient current and/or voltage issues related to ATS unit function. The invention is advantageous in designing the devices used in power distribution to server farms such as are used by companies such as Google or Amazon or cloud computing providers.

In accordance with one aspect of the present invention, a method and apparatus ("utility") is provided for suppressing transient currents in electrical circuits to prevent damage to switching devices such as relays and/or solid-state switching devices. The utility involves transfer switch system, such as an ATS, including a switch unit and a power surge suppression circuit. The switch unit has a first input for receiving a first power signal, a second input for receiving a second power signal, and an output for providing a power signal to a connected load. Each of the inputs provides a power signal via a power cord extending between the switch and a power outlet associated with a power source. The switch unit further includes a switch for selectively connecting one of the first and second inputs to the output depending on a power signal status of at least one of the first and second power signals. The power suppression circuit suppresses power surges at the switch unit. The circuit is disposed either between the switch unit and one of the power outlets or between switch unit and the load. The transfer switch system therefore resists damage to the switch associated with power surges.

One or more power surge suppression circuits may be associated with the automatic transfer switch system. In one implementation, each of the first and second power cords includes a first end for connecting to one of the power outlets, a second end for connecting to the switch unit and a power surge suppression circuit disposed in-line on one of the first and second power cords between the first and second ends of the power cord. Where the switch unit is configured such that the first power source is the primary power source, the power surge suppression circuit may be disposed between the switch unit and the second outlet. Alternatively, power surge suppression circuits may be provided on the output, on both inputs, on one input and the output, etc. The power outlets may be outlets of one or more power strips. For example, a first power strip or a first outlet of a power strip may be associated with a first power source and a second power strip or a second outlet of a power strip may be associated with the second source. In this manner, the first and second inputs of the switch unit may be connected to the first and second power sources. The power strip may have surge suppression functionality as well. In this regard, conventional surge suppression functionality of power strips has been found insufficient to protect the contact surfaces of automatic transfer switches in some cases, but appropriate surge protection could be added to one or more outlets of a plug strip in accordance with the present invention, e.g., an outlet designated as an automatic transfer switch outlet of the strip.

The switch unit is preferably operative for switching from a first state where the first input is connected to the output and a second state where the second input is connected to the output in response to detecting one of a power outage and a degradation of the first power signal from one of the power sources. The switch may comprise one or more electromechanical relays or a solid-state switch. The power surge suppression circuit may optionally be incorporated into the switch housing.

In accordance with another aspect of the present invention, a relay of an automatic transfer switch may be conditioned to better resist power surge events. It has been found that a relay will better resist malfunctions due to power surge events if a contact surface of the relay is conditioned by changing the shape, texture or other morphology of the contact surface. This can be accomplished by applying an electrical power signal to the relay sufficient to change the morphology of the contact surface.

The corresponding utility involves providing a switch unit including a contact surface and applying an electrical signal to the contact surface sufficient to cause the desired change in morphology of the contact surface. Specifically, the switch unit includes first and second inputs for receiving first and second power signals, an output for providing a power signal to a connected load, and a switch for selectively connecting one of the first and second inputs to the output depending on a power signal status of at least one of the first and second power signals. The switch unit includes an electromechanical relay having a contact surface for making an electrical contact between and armature of the relay and a connected circuit. For example, the contact surface may be mounted on the armature or may be part of an electrode for establishing an electrical connection with the armature. The electrical signal is preferably sufficient to cause at least a partial state change to the contact surface, e.g., a portion of the contact surface may become temporarily molten. The electrical signal may be applied directly to the contact surface or may be applied to the switch unit via the first and second inputs. Alternatively, the contact surface may be manufactured with the desired morphology to resist damage due to surges (e.g., by molding the contact surface to the desired morphology) or may be mechanically worked to the desired morphology.

In accordance with a still further aspect of the present invention, a system is provided for use in conditioning a contact surface of an automatic transfer switch. As noted above, it is been found that a contact surface can be conditioned to change the morphology of the contact surface, thereby rendering an automatic transfer switch less susceptible to damage due to power surges. A system can thus be provided to condition the contact surface by applying a power signal directly to the contact surface or to an automatic transfer switch including the contact surface.

The system includes a power signal generator, first and second outputs associated with the power signal generator, and a controller. The power signal generator is operative for producing an electrical power signal. The first and second outputs are adapted for connecting to first and second inputs connected to the contact surface, either directly or via the automatic transfer switch, where the automatic transfer switch includes an electromechanical relay and the contact surface is involved in making an electrical contact between and armature of the relay and a connected circuit. The controller is associated with the power signal generator for controlling the power signal generator to apply the electrical signal to the contact surface, wherein the electrical signal is sufficient to cause a change in morphology of the contact surface. It will be appreciated that parameters that may be involved in this regard include the voltage of the signal, the current of the signal, the time that the signal is applied, a frequency of the signal, the number of cycles during which the signal is applied, and the nature of any impedance capacitance or other electrical characteristics associated with the flow path of the signal. In addition, the material of the contact surface, the shape of the contact surface, the dimensions of the contact surface and other characteristics of the contact surface may be taken into account in applying an appropriate signal.

An associated methodology involves providing a power signal generator, connecting outputs of the power signal generator to the contact surface (directly or indirectly), and controlling the power signal generator to apply one or more electrical signals to the contact surface sufficient to cause a change in morphology of the contact surface. In a preferred implementation, a series of signals, or cycles, of progressing power are applied to the contact surface, such that the earlier signals may render the contact surface, such that the earlier signals, may render the contact surface more tolerant of later signals. The methodology may further include separating the armature from the connected circuit at the contact surface and inspecting the contact surface to ensure that it has the desired characteristics to resist damage due to power surges.

In accordance with another aspect of the present invention, a utility is provided for supplying power to an electrical device. For example, the electrical device may be an automatic transfer switch or another device that is sensitive to power surges, such as a device including an electromechanical relay. The utility involves a first cord cap for connecting to the electrical device, a second cord cap for connecting to a power supply, a power cord extending between the first and second cord caps, and a power surge suppression circuit disposed in-line on said power cord between said first and second cord caps. For example, the first cord cap may be a female cord cap for mating with a male power port of the electrical device (e.g. an ATS unit), and the second cord cap may be a male cord cap for plugging into a female outlet of a power supply unit such as a power strip. As a further example, the first cord cap may be connected to the output of an ATS and the second cord cap may be connected to a piece of equipment. The power surge suppression circuit may be provided in a housing interposed in the power cord between the cord caps. The housing is preferably relatively small, for example, having a maximum dimension of no more than about 6 cm and a volume of no more than about 50 cm³.

BRIEF DESCRIPTION OF THE DRAWINGS

For a better understanding of the present invention and further advantages thereof, reference is now made to the following detailed description, taken in conjunction with the drawings, in which:

The present disclosure is described in conjunction with the appended figures:

FIGS. 10A-10C show a form factor of the relay conditioner of FIG. 9.

FIG. 11 is a voltage versus time diagram illustrating the surge conditions that are addressed in accordance with the present invention.

Figure 1:
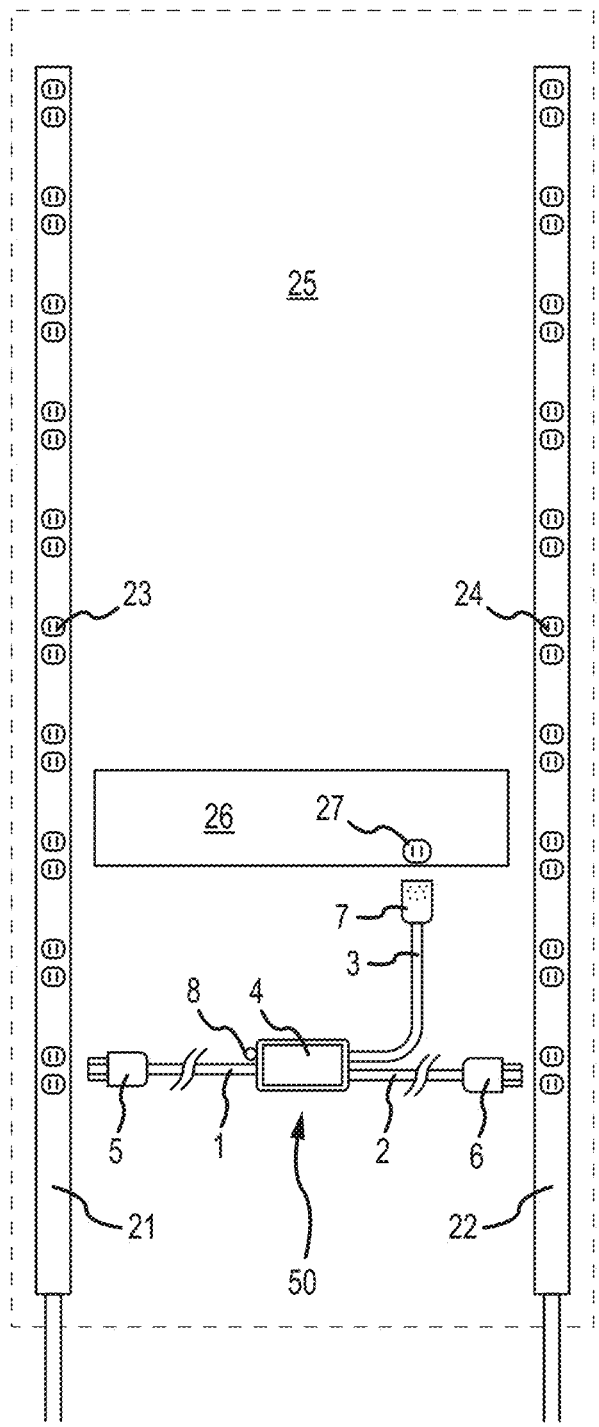
FIG. 1 shows an example of an operating environment of an ATS which may include a surge suppression circuit in accordance with the present invention.

In the appended figures, similar components and/or features may have the same reference label. Further, various components of the same type may be distinguished by following a first, e.g., numerical label with a second, e.g., alphabetic label that distinguishes among the similar components. If only the first reference label is used in the specification, the description is applicable to any one of the similar components having the same first reference label irrespective of the second reference label or lack thereof.

DETAILED DESCRIPTION

This section describes a method to construct a number of circuits in a number of devices such as power cords, ATS devices or other devices. Many of the examples relate to compact ATS units. While this is believed to be an important use case, it will be appreciated that the invention is applicable in a variety of other contexts. Accordingly, the following description should be understood as exemplary and not by way of limitation.

In one instantiation, in connection with a power cord associated with an ATS, the power surge circuit of the present invention can be implemented in a very small form factor in-line. This has a number of advantages that are detailed below. A point to note is that depending on the design of a given ATS unit, the in-line power surge circuit can be put on the output or one or both power inputs of the ATS unit. This is because an ATS that is designed and/or has been set to use the "A" side as the preferred and primary power source would only need the "B side" input (secondary power source) to have a power surge protected power cord. Most ATS devices have a preferred power source, which is the "A" primary source. One ATS developed by Zonit Structural Solutions, of Boulder, Colorado, (Zonit) allows the user to select which source to use, as the primary source and change the primary source as desired. The ATS will use the "A" source if it is available and optionally for some designs that measure power quality, of sufficient quality. An "A side" to "B side" ATS transfer is done as soon as the "A" power drops far enough and long enough. The normal definition is a power quality disturbance can last up to 4 milliseconds, after which it becomes a power outage. Therefore most ATS units monitor the "A" side power and then switch to the "B" side power as fast as possible after 4 milliseconds has passed.

This means that if the "A" side and "B" side power are of different phases (this is very common in modern data centers that use two hot phases for 208V power distribution, or three phase power distribution which has become the most common method due to increasing power levels at the rack) the difference in voltage levels between the power sources can cause the high transient current and/or voltage surges in the circumstances described above. It should be noted that such differences in voltage levels can therefore result from a difference in voltage between, or between a voltage due to a capacitor charged by one of the signals and the voltage of the other signal, the signals, not a surge in one of the signals. Accordingly, the problem is not addressed by surge protection circuits in one or both of the power lines. This is not a problem when transferring from the "B side" to the "A side". This is true because when a "B" side to "A" side transfer is performed, both sides have power up and running and potentially of sufficient quality. In this case the ATS can time the transfer to occur at the zero crossing of the "A" side power being transferred to, so no high transient currents and/or voltage events normally occur.

FIG. 1 below shows the operating environment of an ATS (in this case, one form factor of a micro ATS developed by Zonit). Thereafter, an example of the surge suppression or surge control circuit and various formfactors and alternate implementations will be described.

An exemplary diagram of an application of an automatic transfer switch 50 is shown in FIG. 1. Equipment 26 may be mounted in a rack 25 having a primary power strip 21 and a secondary power strip 22 mounted on opposite sides of the rack 25. It will be appreciated that outlets associated with primary and secondary power sources may alternatively be provided in a single plug strip, from a rack mounted power supply unit, or via other means. The illustrated power strips 21 and 22 include multiple outlets 23 and 24, respectively. The primary and secondary input plugs 5, 6 of the module 4 may be plugged into the outlets 23, 24, respectively, and the output receptacle 7 of the module 4 may be coupled to a plug 27 on the equipment 26. In normal use, this application may be duplicated for as many pieces of equipment as are mounted in the rack 25. In operation, the equipment 26 may receive power from the primary power strip 21, through the primary input cord 1 and the output cord 3. When an interruption of the voltage on the primary power strip 21 occurs, the automatic transfer switch 50 may then couple the equipment 26 to the secondary power strip 22, through the secondary input cord 2 and the output cord 3. In this manner, power redundancy is provided to the equipment 26.

The automatic transfer switch 50 may be particularly well-suited for high-density applications where the rack 25 may contain forty or more pieces of equipment. For example, in such a case, forty automatic transfer switches 50 with eighty input plugs 5, 6 and forty output receptacles 7 may be needed. Typically, this density requires careful attention to cord management in order to prevent blocking of air flow that may inhibit cooling of the equipment mounted in rack 25. Accordingly, in such applications, the automatic transfer switch 50 reduces this problem by including cords that have lengths that are suited for the specific application.

Various form factors (sizes and shapes) of the ATS unit are described below. The shape of the illustrated module 4 is substantially rectangular, in both end and side views, with the output cord 3 and one of the input cords 2 attached to one end of the module 4 and the other input cord 1 attached to the opposite end. Also, the cross-sectional area of the module 4 may be less than about 3 square inches (with each axis no more than about 1.75 inches) and, more preferably, less than about 2 square inches, and the length of the module 4 may be less than 5 inches, with a total volume contained within the module 4 of less than 10 and, more preferably, less than about 7 cubic inches.

One distinguishing feature of this embodiment of the automatic transfer switch 50 is that the relay 12 does not require any additional control circuits to operate. The absence of relay control circuits permits the automatic transfer switch function to be contained in a much smaller space than that required by switches with complex circuitry (e.g., high-speed controllers, optical isolators, current sensors, synchronizing circuits, or the like). The use of a DPDT relay (or matched multiple relays) to ensure break-before-make connections prevents connecting the two power sources in parallel, which may cause damage to equipment. The automatic transfer switch 50 takes advantage of the inherent energy storage capability of most common EDP equipment to operate the equipment during the short time interval (e.g., a few milliseconds) between the breaking of a connection from one source and the making of a connection to the other source. In this manner, the automatic transfer switch 50 provides the automatic transfer function in less space and at lower cost than traditional automatic transfer switches.

The automatic transfer switch 50 also provides for switching power sources right at the input to the equipment, thereby minimizing the probability of a failure between the switch and the equipment. Additionally, the automatic transfer switch 50 occupies a relatively small space, and it provides for better cable management in rack-mounted equipment. The length of the cords may allow placement of the module 4 adjacent to the back panel of each piece of equipment, and may allow connection to power strips without excess cord length. This configuration eliminates the tangle of power cords usually associated with rack-mounted equipment. Although the automatic transfer switch is shown as being positioned between a piece of equipment and a power strip or other power source receptacles, it will be appreciated that the automatic transfer switch may alternatively or additionally be located elsewhere in the power distribution topology. For example, the switch may be located in a standard duplex receptacle, in a dual power source plug strip, upstream from a pair of single power source plug strips, in a uniform power distribution (UPD) module, upstream from a pair of UPD modules or otherwise in connection with a leaf, branch or root of the topology of a power distribution system. In addition, the switch may be used in connection with interleaved UPD modules as described in PCT Application PCT/US2009/038427 entitled "Power Distribution Systems and Methodology" which claims priority from U.S. Provisional Application 61/039,716, both of which are incorporated by reference herein, to provide further options to avoid disruption of power delivery. Some of the advantages of the power cord in-line surge control method are listed below. See FIGS. 3-6 for some example instantiations that show details of where the circuit can be used in the context of a micro ATS implemented between equipment and a plug strip.

1. The power surge circuit—a sample circuit design, nicknamed "ZCrush", is shown in FIG. 1—can be placed in the power topology anywhere it is required using a variety of forms.
   a. As an additional power cord or power module (the power surge circuit is placed in metal or plastic molded enclosure that is shaped as needed for the application and is as small as is practical; it may be connected in-line via connectors, hardwire connection(s), or plugs and receptacles or any combination of these that is needed for the application) placed in the power path at the required location. This is a convenient implementation to retrofit to an existing ATS deployment.
   b. As one or both input power cords to an ATS unit. For units with input receptacles, this is a convenient implementation to retrofit to an existing ATS deployment.
   c. As the output power cord of an ATS unit.
   d. As the connecting power cord between an ATS unit that has output receptacles and the device being powered. The Zonit locking power cord technologies incorporated above by reference make many of these options easy to implement in a secure fashion.
2. It can be integrated into a strain relief device, such as the Zonit Micro ATS "Y" cord model strain relief.
3. It can be integrated into the case of small form factor ATS units, such as the Zonit Micro ATS or the Zonit Mini-ATS in any of the Mini-ATS instantiations.
4. It can be used anywhere in a power path where a high transient current and/or voltage event needs to be controlled. Its small form factor makes it easier to use as an integrated solution (in a device enclosure) or external solution (outside the enclosure) than larger, bulkier traditional solutions. This is a key advantage, traditional methods just do not fit in the space required.
5. It can be integrated into the circuitry of an ATS by adding the transient surge circuit to the design of the ATS. This can be done by adding it to an existing PCB layout or may be done by implementing it a separate daughterboard that is connected and mounted as needed by the specific application. The latter approach may be desirable because it has minimal regulatory agency impacts such as on Underwriters Laboratory certification.

In yet another instantiation, an ATS can be designed to not be vulnerable to transient current and/or voltage surges. Example designs are shown in the incorporated documents noted above. This design uses a combination of relay and silicon switching methods to eliminate the issue as described in the incorporated documents.

Figure 2:
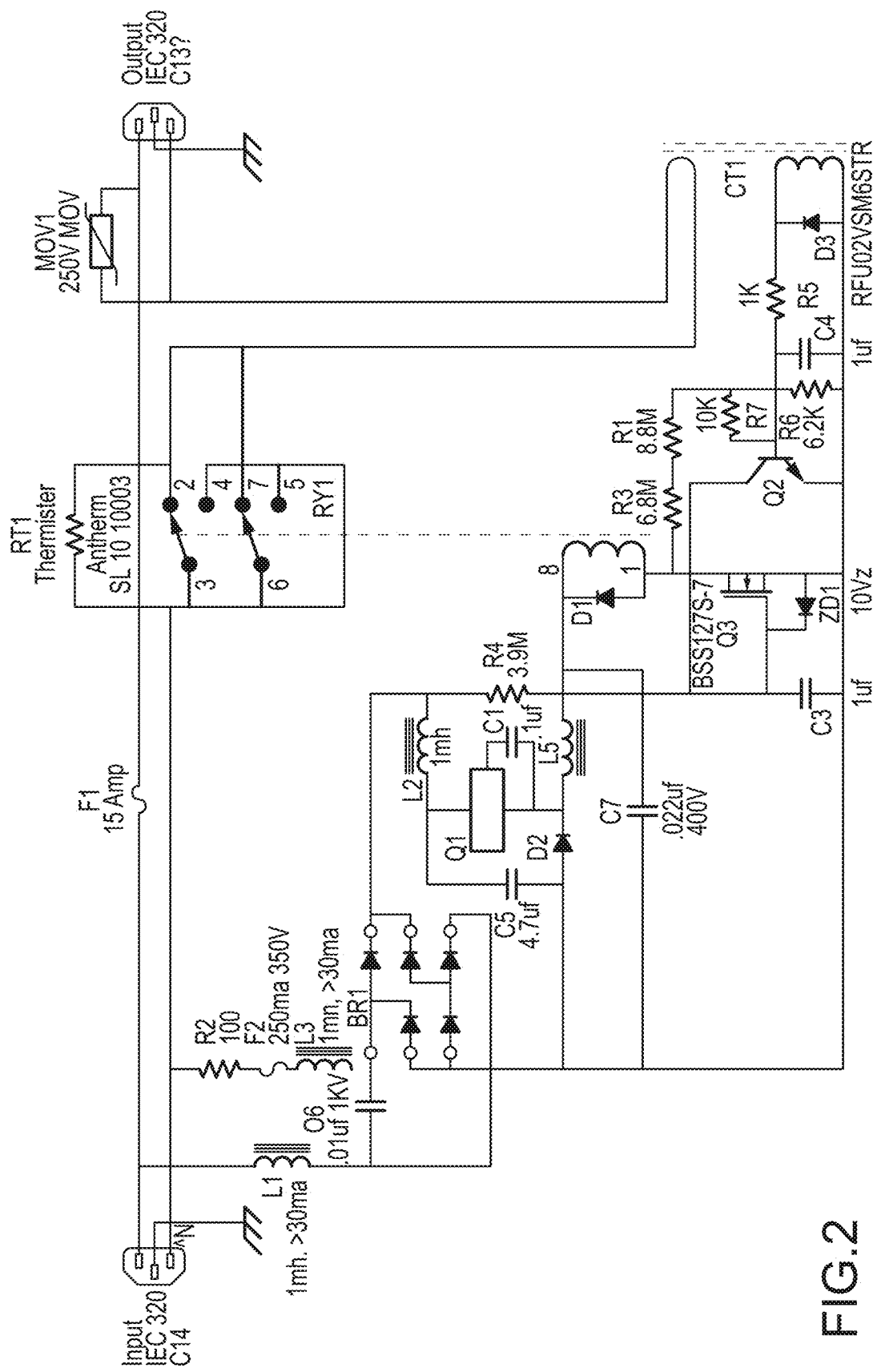
FIG. 2 shows one possible instantiation of a compact power surge suppression circuit in accordance with the present invention

The surge suppression circuit of FIG. 2 limits the currents experienced at the contact surface, even in surge scenarios as noted above. This can be done by limiting the voltage experienced at the contact surface (e.g., by controlling the voltage or relative voltage on one or both power lines) or by ensuring that there is sufficient impedance during the critical time period. The circuit of FIG. 2 ensures that there is resistance to limit peak current during the critical time.

Figure 3:
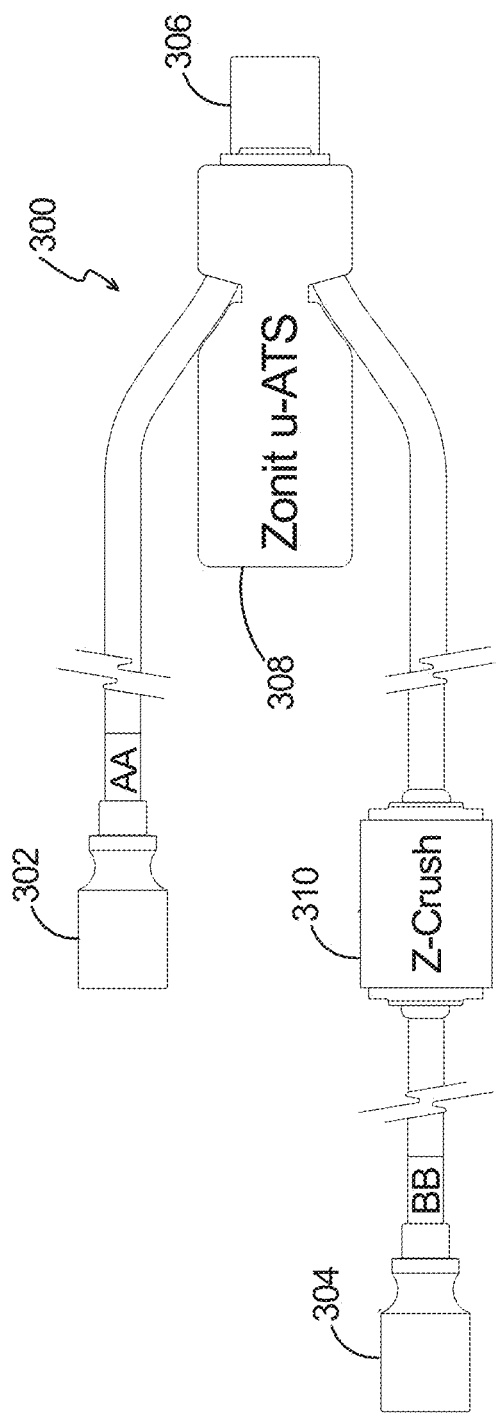
FIGS. 3-6 show examples of several possible form factors to implement one aspect of the invention in an external device or as part of an ATS design. The Zonit Micro Automatic Transfer Switch is used as a representative example of a very compact ATS.

FIGS. 3-6 show various form factors of a surge suppression circuit that can be used in connection with an ATS or other vulnerable devices in accordance with the present invention. FIG. 3 shows an ATS system 300 with an integrated in-line surge suppression circuit. Specifically, the system 300 includes a primary power cord terminating in cord cap 302 for receiving power from a primary power source and a secondary power cord terminating in cord cap 304 for receiving power from a secondary power source. The system 300 further includes an output 306 for connecting to an output load such as a piece of equipment. In the illustrated example, the output 306 is a female outlet such that the system 300 can be directly connected to a male power port of a piece of equipment. The system 300 further includes a micro-ATS module 308 operative to sense a power outage or degradation of signal quality for the power signal of at least the primary power source and, in response, to switch the power supply from the primary source to the secondary power source. A surge suppression circuit 310 is interposed in the secondary power cord between the module 308 and the cord cap 304.

Figure 4:
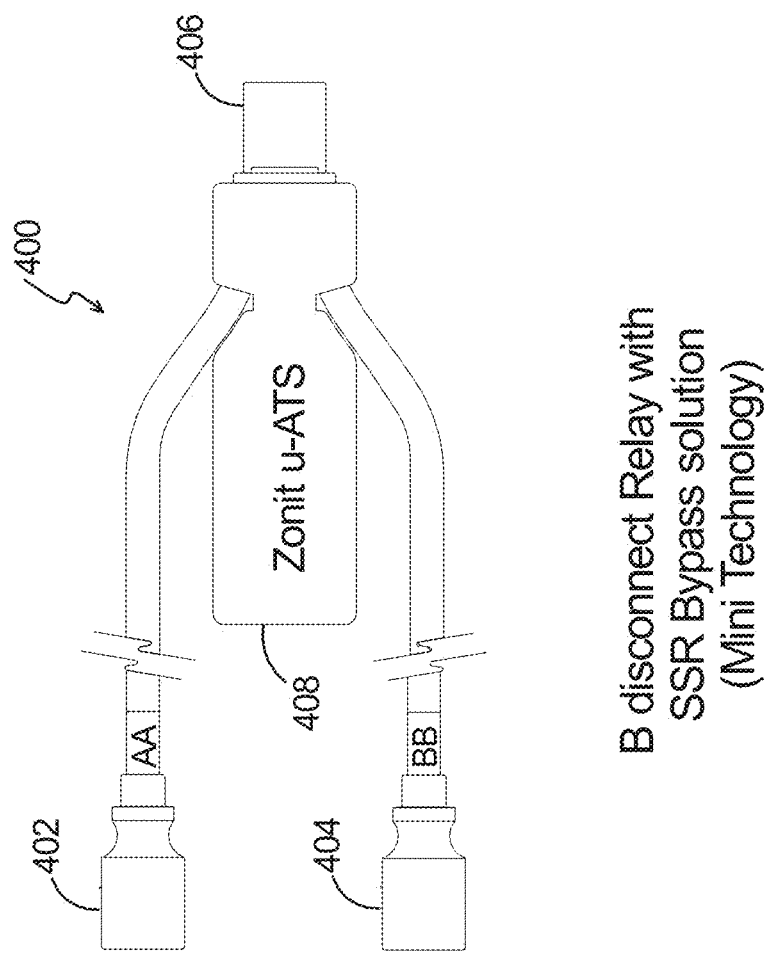

FIG. 4 shows an ATS system 400 that is similar to the system of FIG. 3 in that it includes a primary power cord terminating in a cord cap 402, a secondary power cord terminating in a cord cap 404, and an output 406 that can be directly connected to a piece of equipment. However, in the embodiment of FIG. 4, the micro-ATS module and the surge suppression circuit are both provided within housing 408. The surge suppression circuit may be operative to suppress surges on the primary power line, the secondary power line, or both. Alternatively, the surge suppression circuit may suppress surges on the output circuit.

Figure 5:
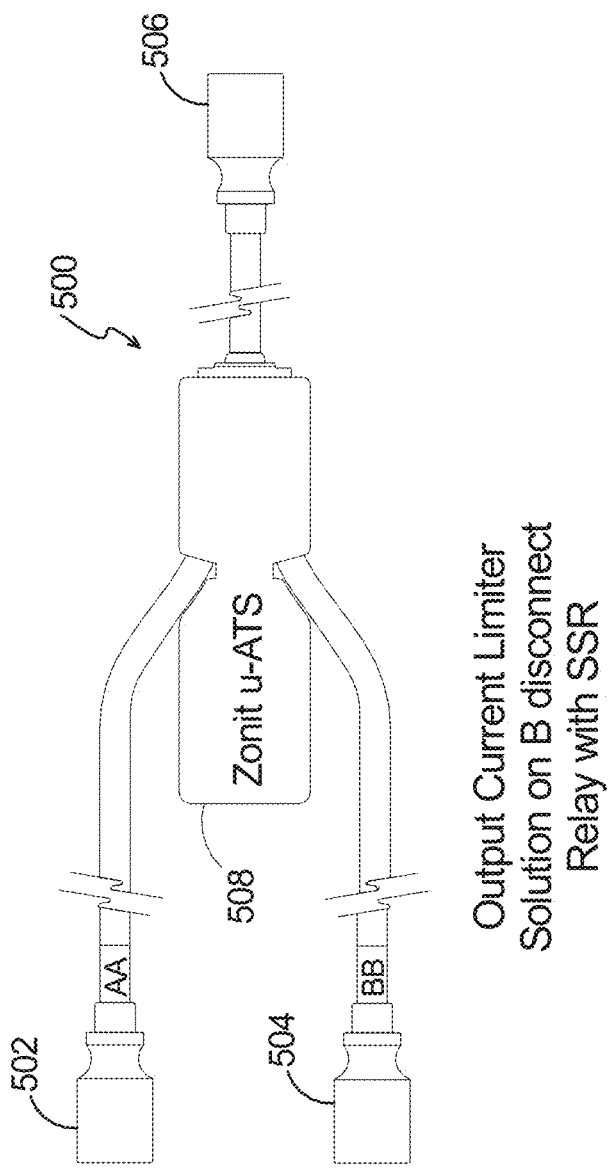

The ATS system 500 of FIG. 5 is similar to the system of FIG. 4 in that it includes a primary power cord terminating in a cord cap 502, a secondary power cord terminating in a cord cap 504, an output 506, and a housing 508 incorporating a micro-ATS module and a surge suppression circuit as described above. However, the output 506 is connected to the housing 508 by a power cord such that the housing 508 is not directly connected to a power port of a piece of equipment.

Figure 6:
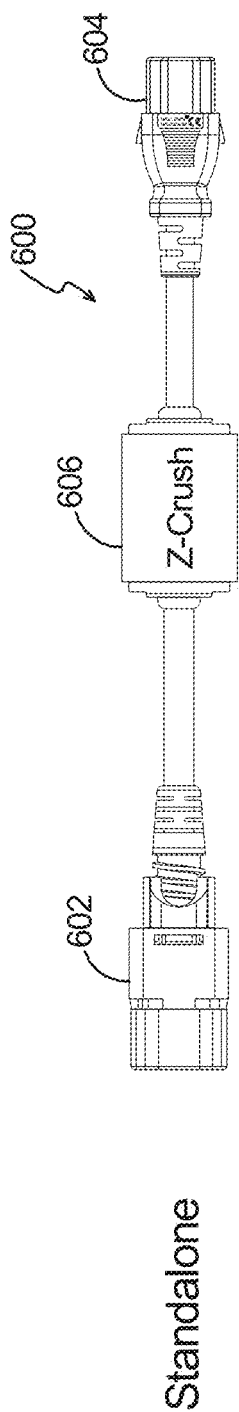

FIG. 6 shows a standalone surge suppression power cord system 600 in accordance with the present invention. The system 600 includes a power cord having a first cord cap 602 at a first end thereof and a second cord cap 604 at a second end thereof. For example, the first cord cap 602 may include a female outlet for connecting to an input of an ATS or another piece of equipment, and the second cord cap 604 may include a male plug for connecting to a plug strip or other power source. A surge suppression circuit 606 is interposed in line on the power cord between the first cord cap 602 and the second cord cap 604. The system 600 can thus be used in a variety of contexts including as an aftermarket product to protect an ATS (e.g., by connecting to either or both inputs of the ATS or to the output of the ATS) or another vulnerable device.

Figure 13:
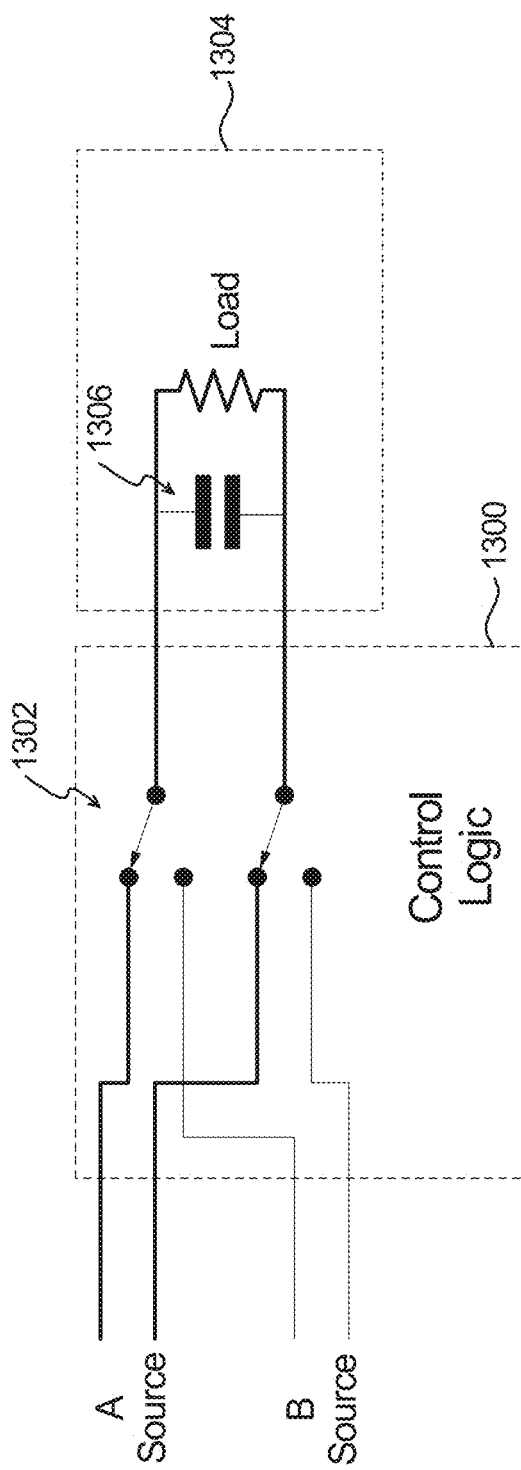
FIG. 13 is a schematic diagram of an ATS that may be used with a surge suppression circuit in accordance with the present invention.

FIG. 13 shows a very basic diagram of a transfer switch 1300 in connection with which a surge suppression may be employed as described below. The reference numbers of FIG. 13 are carried over to corresponding elements in FIGS. 14-19. The internal relay 1302 is shown in the connected to A position. The output is connected to a load 1304 that has a capacitor 1306 across the hot leads of the output of the ATS 1300. A normal transfer would possibly result in the energy stored in the capacitor 1306 being discharged at the moment when the contacts make connection to the B side relay contacts. Those contacts will have voltages present that may be opposing the voltage stored in the capacitor 1306 when the disconnection from the A side occurs.

Figure 12:
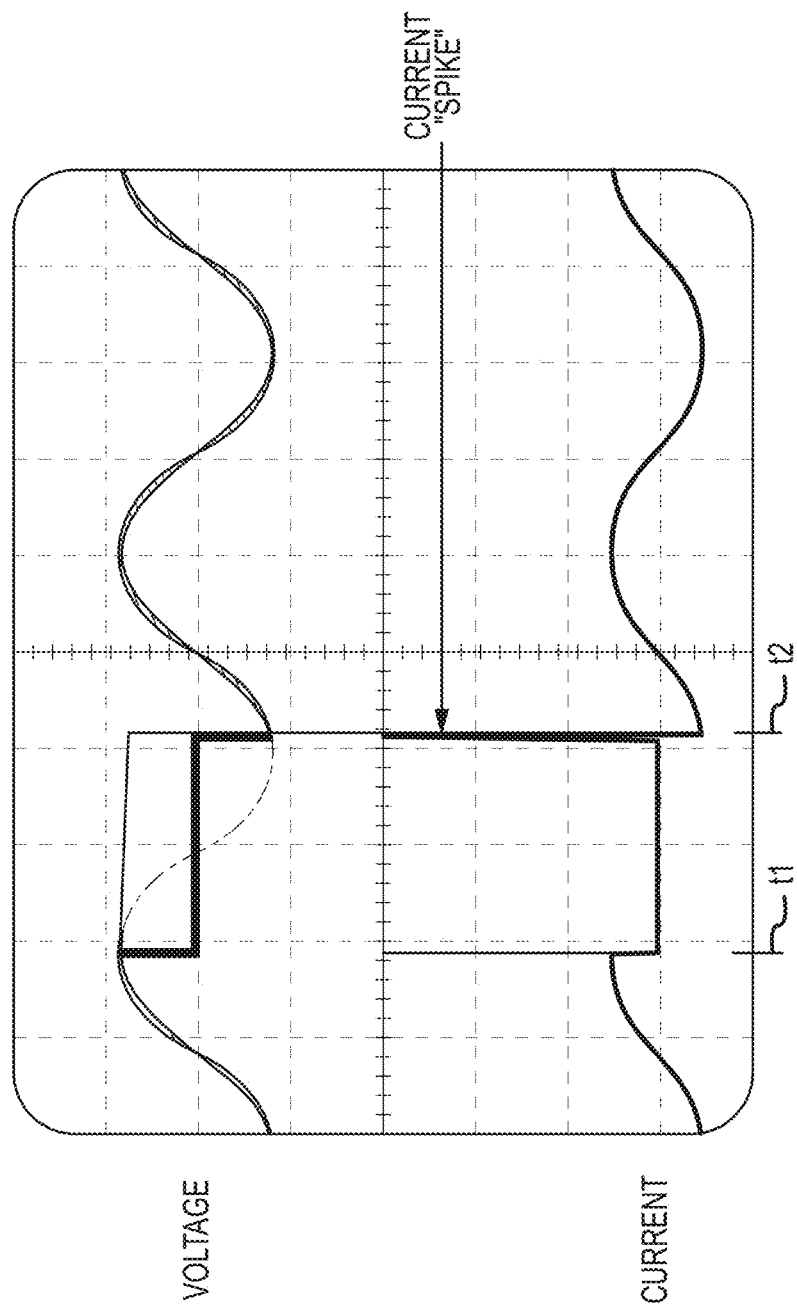
FIG. 12 shows voltage and current diagrams corresponding to FIG. 11.

FIGS. 11-12 show the relationship of these voltages and possible effect on the output current the relay must conduct. The current "spike" shown, at time t2, is the result of the positive capacitor charge remaining from the time, t1, when the AC voltage became disconnected from the input. It is shown in this example that the capacitor has not discharged significantly due to a very minimal load resistance. This can be true for a variety of reasons. In particular, the internal capacitance of the load power supply may have large energy storage capacitors that are only charged at the very peak of the AC cycles. The remainder of the AC cycle is always at a voltage lower than the voltage stored in the internal storage capacitors of the power supply. This leaves no path for the energy stored in the external line connected capacitor to discharge to, so the voltage, and hence stored energy, remains until the ATS connection to the power line occurs.

Figure 14:
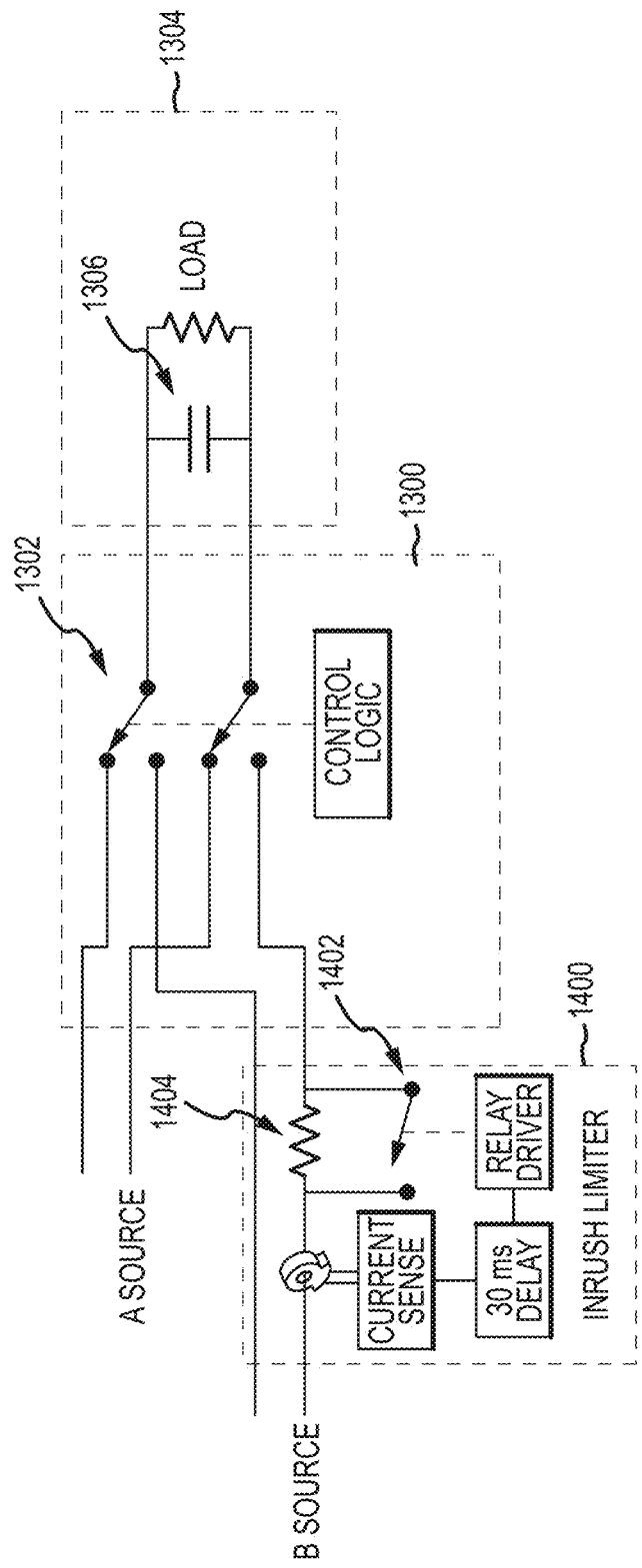
FIGS. 14-16 are schematic diagrams illustrating the operation of an external surge suppression circuit in accordance with the present invention.
Figure 15:
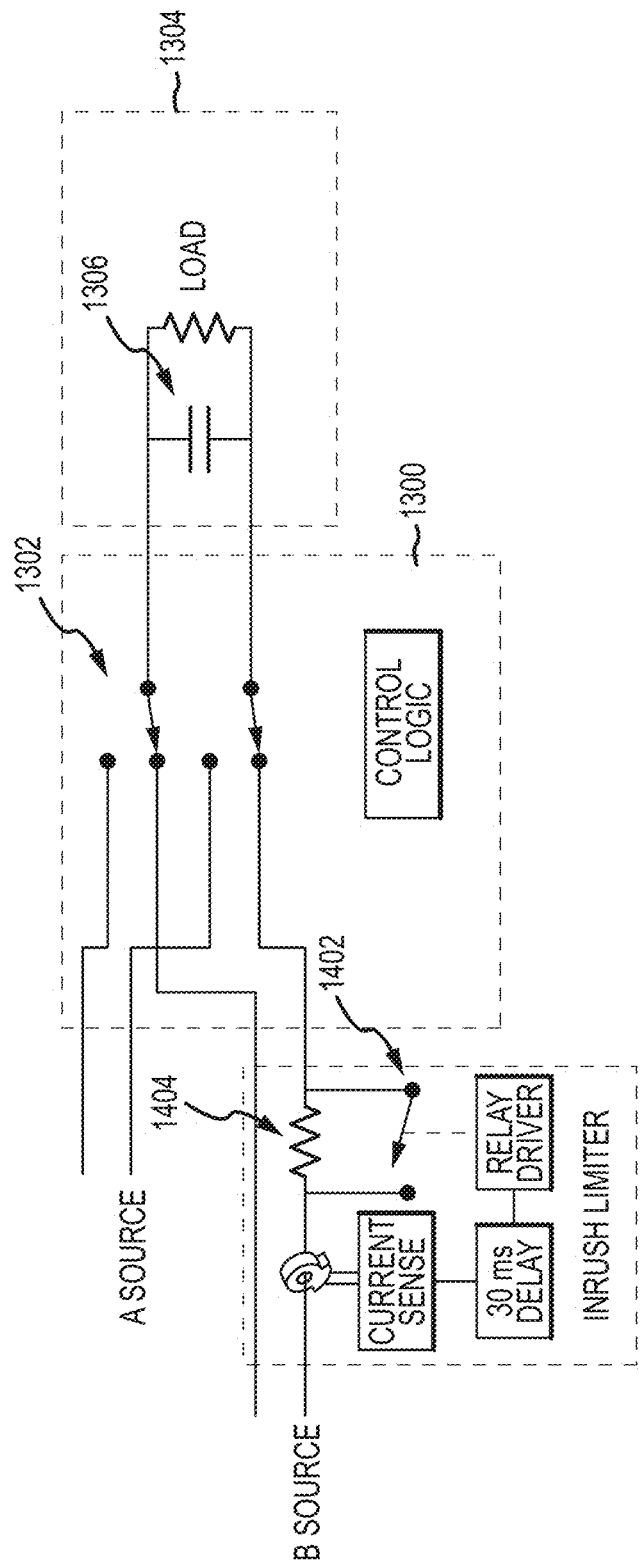
Figure 16:
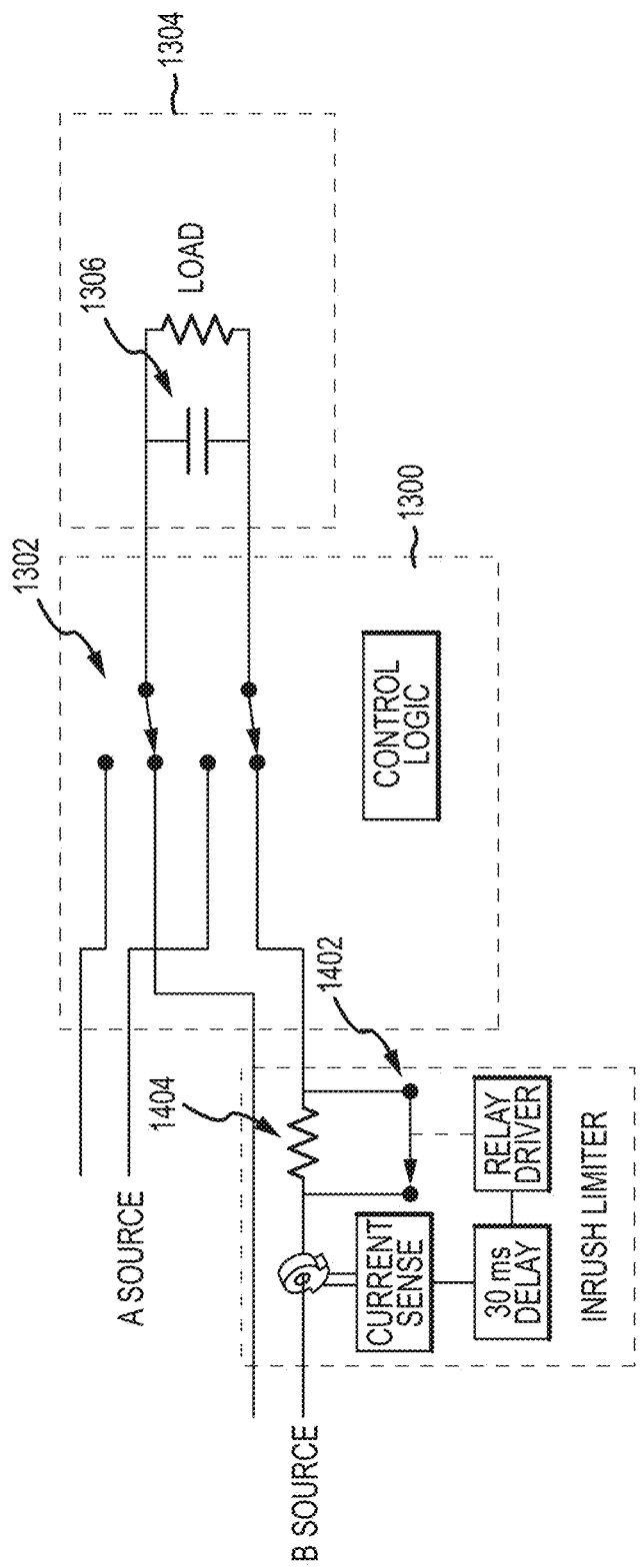

Referring to FIGS. 14-16, to prevent the currents from becoming excessively high, or to a level that could cause the contacts of a relay based ATS to become welded together, a simple surge suppression circuit 1400, or inrush limiter, is utilized for applications where the inrush limiter is connected internally to the ATS 1300. FIG. 14 shows the ATS 1300 with the circuit 1400 in normal operation. Current flows through the ATS relay 1302 to the load 1304 and back as shown.

When the A side power fails, the ATS begins by disconnecting the power from the A side source, and moving the relays to the opposite input, the B side power source as shown in FIG. 15. At that time, the relay 1402 shown in the Inrush limiter circuit 1400 is presently open. It is a relay that is normally open, or a so-called form A relay.

FIG. 15 shows the current path through the ATS 1302 to the load 1304 shortly after the completion of the transfer. Note that the resistor 1404 in series with that power path located inside of the Inrush Limiter circuit 1400. This resistance is generally very small, about 4 to 10 ohms. But it is sufficient to limit the peak current from the discharging capacity 1306 located in the load 1304 as shown. For example, on a 120 VAC circuit, the peak voltage possible is about 170 Volts. If the AC sine wave is exactly opposite when the transfer completes, the peak voltage at that time could be −170 volts, and when summed with the residual voltage stored in the capacitor (as much as +170 volts), the difference is 340 volts. Thus, if a 10 ohm resistor is in series with this, the peak current is limited to 34 Amps. Various resistances could be used for specific applications, but in the case of the Zonit uATS products we use a 10 ohm resistor for products in the 15 amp and under group.

FIG. 16 shows that the Inrush limiter driver circuit 1400 has completed about a 30 millisecond power delay to the Inrush limiter relay 1402 and has released that relay 1402. The current now returns to flowing through the contacts of the Inrush limiter relay 1402 and not through the resistor 1404. This saves energy and delivers the full voltage to the load 1304.

The Zonit uATS products return power from the B side to the A side always at the zero voltage crossing point of the AC cycle. See description of Zonit uATS in the incorporated cases for clarification. Since the transfers from B side to A side occur at the zero crossing, there will be no energy stored in the capacitor to dissipate when the contacts connect the A side power source to the load, and thus no excessive currents will occur.

Figure 17:
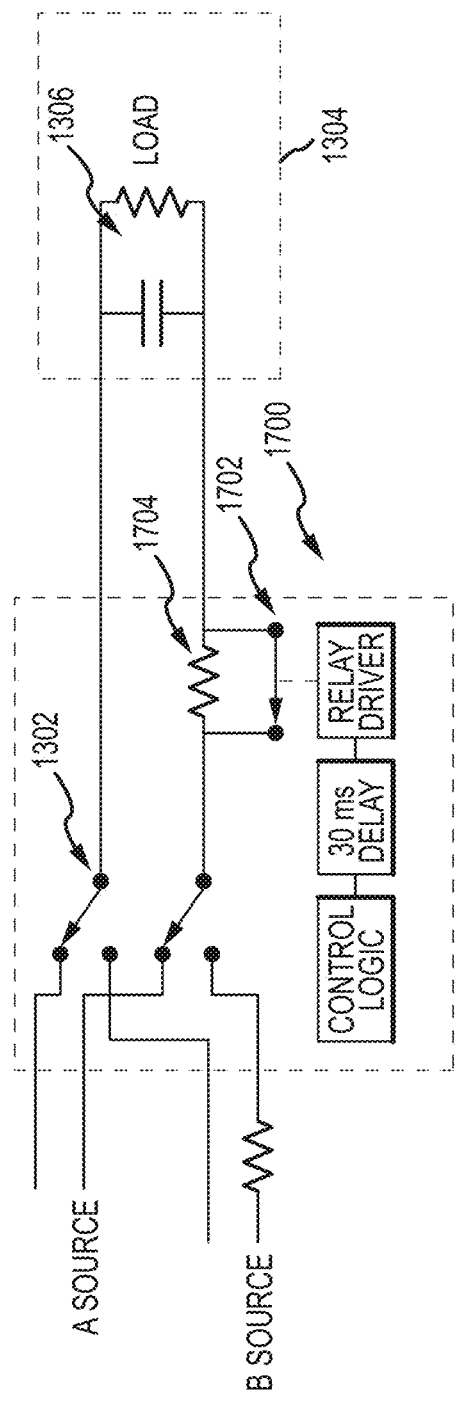
FIGS. 17-19 are schematic diagrams illustrating the operation of an internal surge suppression circuit in accordance with the present invention.
Figure 18:
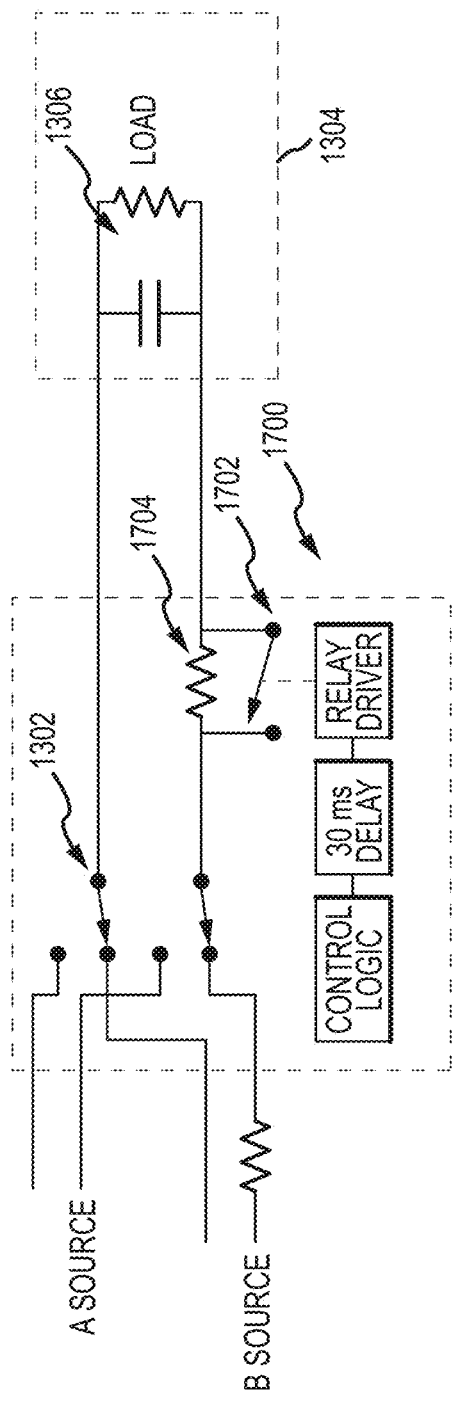
Figure 19:
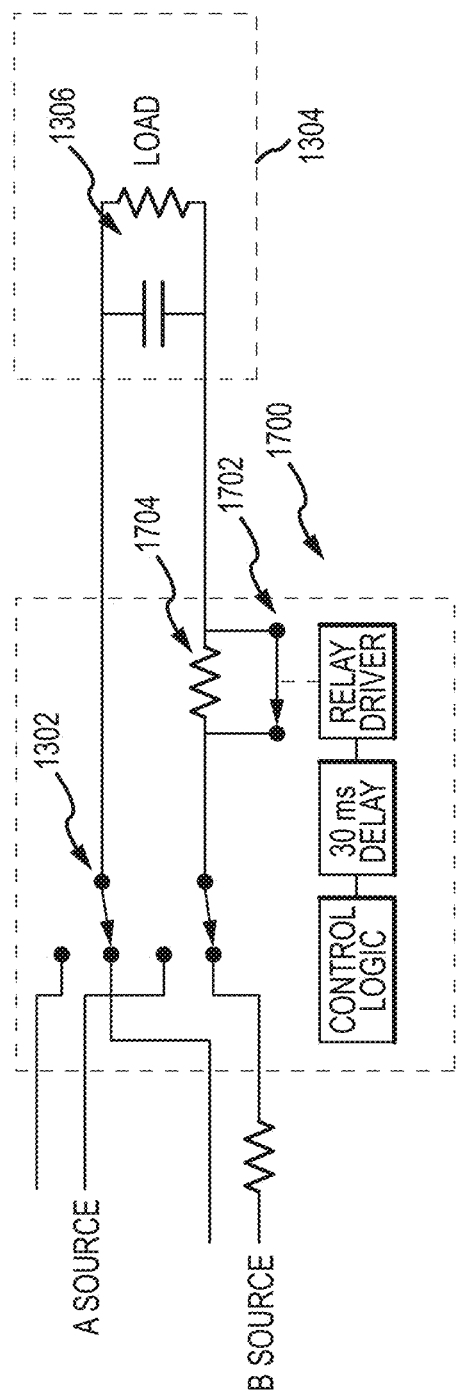

FIGS. 17-19 show a simple circuit for applications where the inrush limiter is connected internally to the ATS housing (see FIGS. 4-5). FIG. 17 shows the ATS with the internal circuit 1700 in normal operation. Current flows through the ATS relay 1302 to the load 1304 and back as shown. It is returning through an additional relay 1702 that is normally closed (NC). A resistor 1704 is shown across the contacts of that relay contact, but it does nothing since all the current is bypassed around the resistor 1304 through the contacts.

When the A side power fails, the ATS begins by disconnecting the power from the A side source, and moving the relays 1302 to the opposite input, the B side power source. At that time, the relay 1702 shown in the Inrush limiter section on the output of the transferring relays is presently closed. It is a relay that is normally closed, or a so-called form B relay. At the very instant that power is sent to the ATS relays to commence transferring to the B side, power is also sent to the inrush limiter relay on the output of the transfer relays causing it also to start to open.

FIG. 18 shows the current path through the ATS to the load shortly after the completion of the transfer. Note that the resistor 1704 in series with that power path is now conducting the power. The relay contacts across the resistor 1704 have opened simultaneous with the transfer, and thus, by the time power is restored to the load through the ATS contacts, that power must go through the resistor 1704. This resistance is generally very small, about 4 to 10 ohms. But it is sufficient to limit the peak current from the discharging capacitor located in the load 1304 as shown. For example, on a 120 VAC circuit, the peak voltage possible is about 170 Volts. If the AC sine wave is exactly opposite when the transfer completes, the peak voltage at that time could be −170 volts, and when summed with the residual voltage stored in the capacitor (as much as +170 volts), the difference is 340 volts. Thus, if a 10 ohm resistor is in series with this, the peak current is limited to 34 Amps. Various resistances could be used for specific applications, but in the case of the Zonit uATS products we use a 10 ohm resistor for products in the 15 amp and under group.

FIG. 19 shows that the Inrush limiter detector circuit 1700 has completed about a 30 millisecond power delivery to the Inrush Limiter relay 1702 and has released that relay 1702. The current now returns to flowing through the contacts of the Inrush limiter relay 1702 and not through the resistor 1704. This saves energy and delivers the full voltage to the load.

The Zonit uATS products return power from the B side to the A side always at the zero voltage crossing point of the AC cycle. See description of Zonit uATS for clarification. Some products, such as the Zonit uATS Industrial will not necessarily return the power to the A side of the zero Crossing. Thus, the Inrush limiting function may be necessary on that half of the cycle. Since the Inrush limiter relay is driven by any transition of the main ATS relay, The 30 millisecond routing of power through the resistor will also occur when the Main ATS relay releases to restore power to the A side.

Figure 7A:
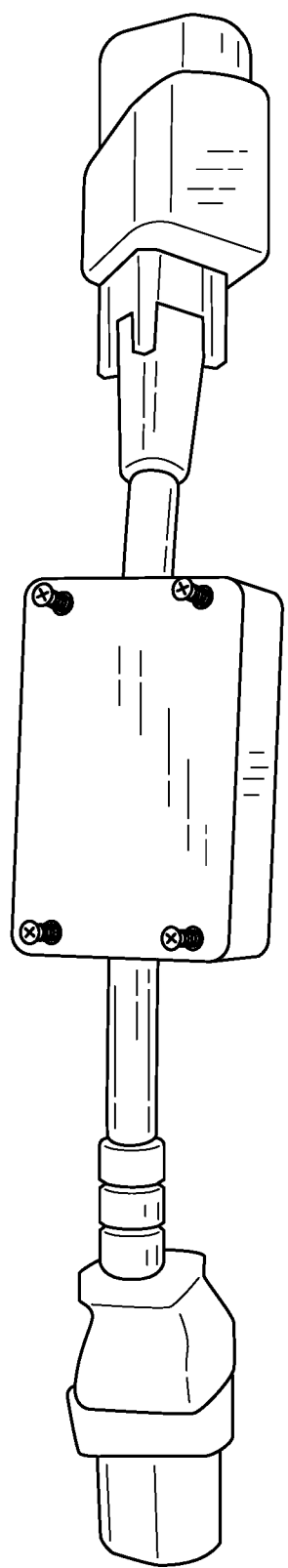
FIGS. 7A-7C are photographs showing one possible instantiation of a surge suppression circuit in a power cord in accordance with the present invention.
Figure 7B:
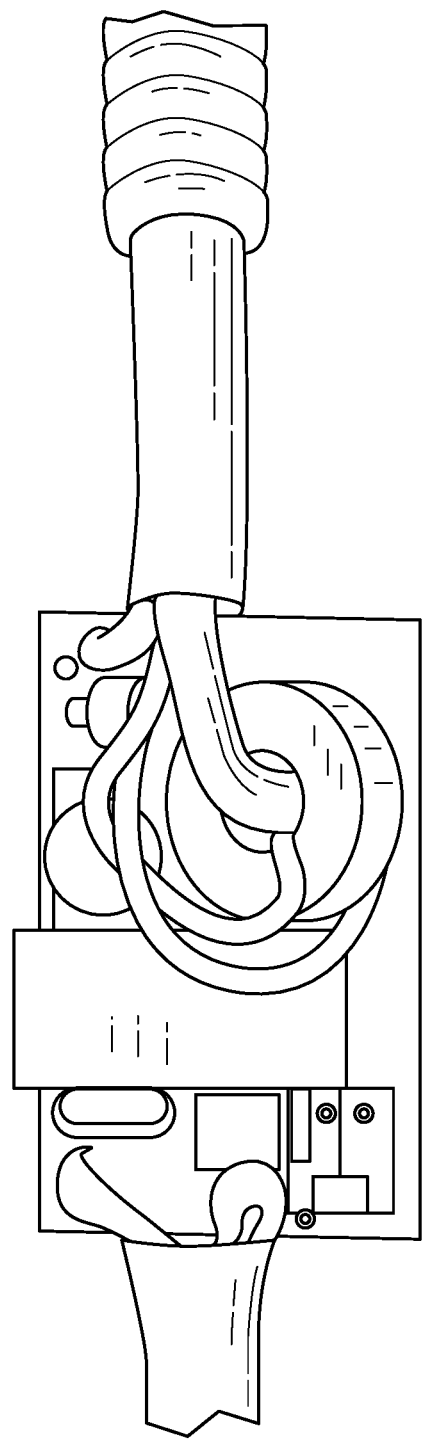
Figure 7C:
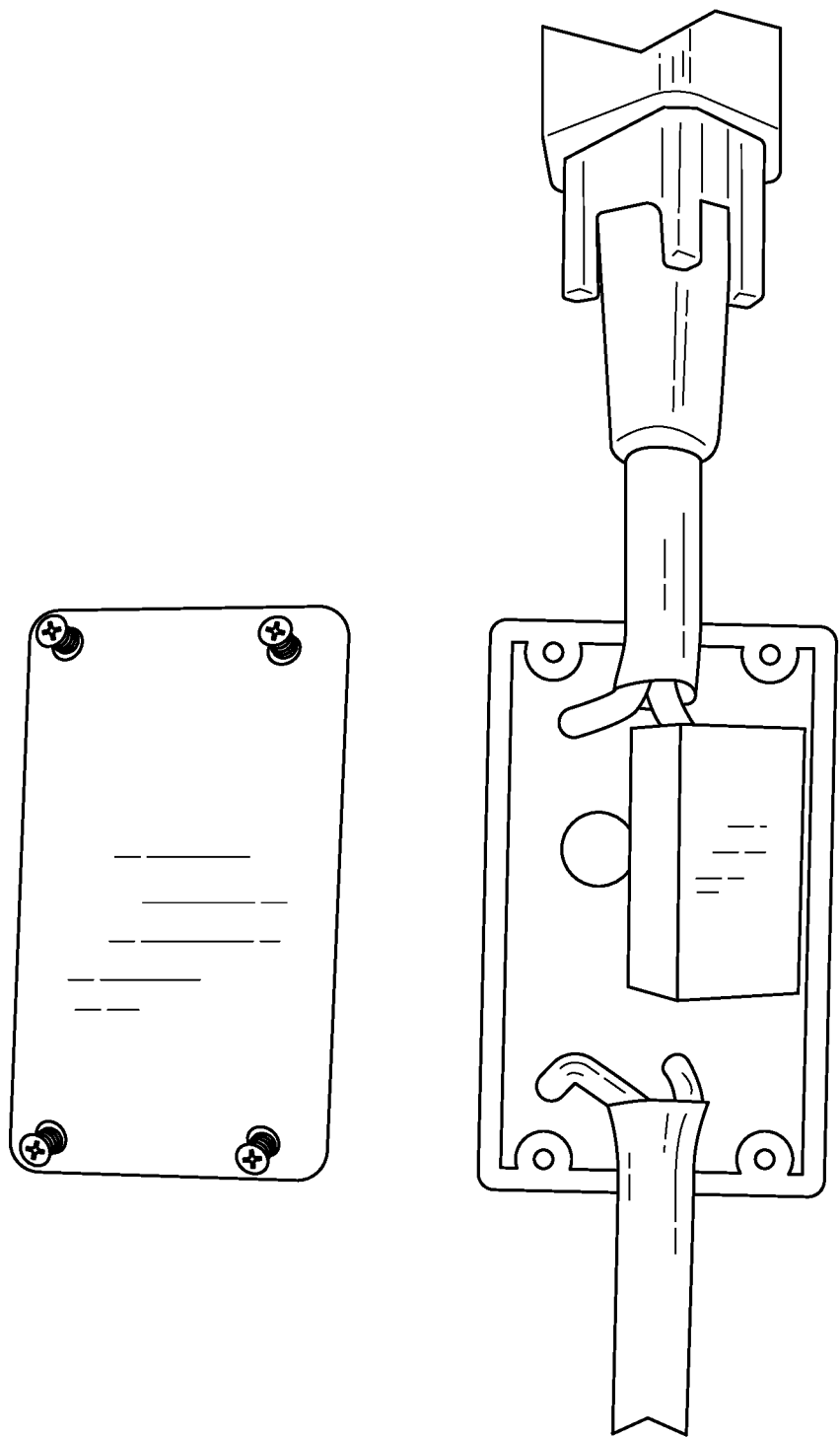

FIGS. 7A-7C are photographs showing a power cord with an in-line surge suppression circuit similar to that illustrated in FIG. 6. In particular, FIG. 7A shows a perspective view of the power cord with the in-line surge suppression circuit housing mounted thereon. FIG. 7B shows a close-up of the in-line surge suppression circuit with a portion of the housing removed. A ruler is also shown in the photograph to provide an indication of the size of the housing. In this case, the housing has a maximum dimension of about 55 mm. FIG. 7C shows a close-up of the in-line surge suppression circuit with a portion of the housing removed (opposite that of FIG. 7B).

In accordance with another aspect of the invention, the relays used in a relay-based ATS can be designed and/or conditioned to lower their vulnerability to transient current and/or voltage surges and the resultant micro-welding possibility. Relay conditioning can be done to relays before they are installed during ATS manufacturing or it can be done to the relays of already manufactured ATS units which is convenient for application of the process in the field or as a re-manufacturing process. The conditioning process can result in significant increases in the resistance of the relay to point micro-welding, allowing it to reliably tolerate 2× or more high transient current and/or voltage events. An example is that for general purpose 2GRL relays used, for example, in a data center environment, the point micro welding resistance can be increased from approximately 1 microfarad of capacitance discharge to 2 microfarads of capacitance discharge.

Figure 9:
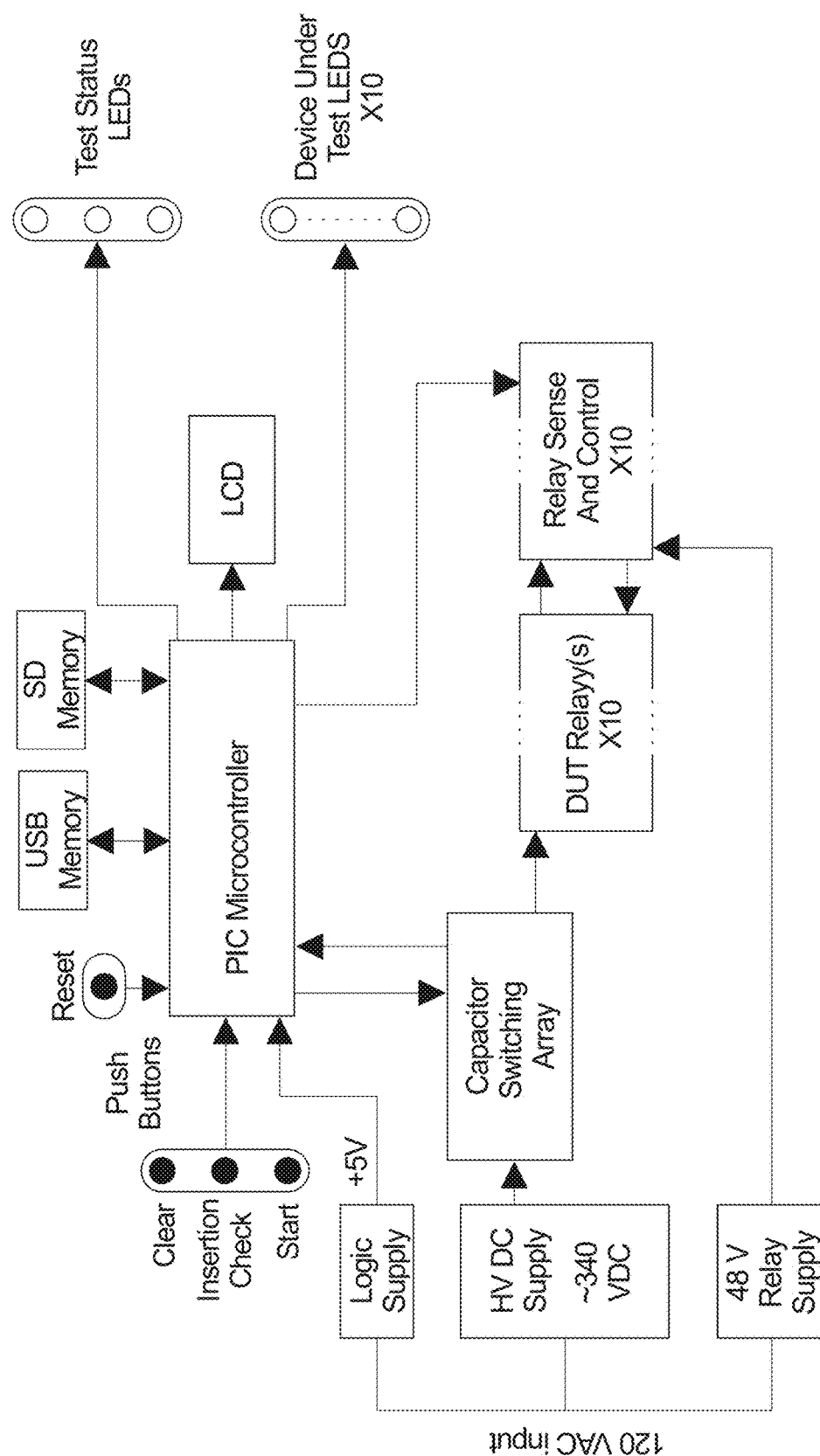
FIG. 9 shows one possible instantiation of a relay conditioner in accordance with the present invention that tests, times and groups tested relays as described herein.

To condition relays, an apparatus is provided. An example relay conditioning apparatus is shown in FIG. 9. This apparatus applies specific surge signals, which can be programmed as needed to condition the relays. These surge currents arc across the relay contacts and cause the topology and condition of the relay contacts to change. These changes increase the resistance of the relay to point micro-welding when exposed to high transient current and/or voltage events. The changes to the relay contacts can be described as follows. General purpose relays are built with contact materials and shapes that are optimized to both give high actuation count service lifetime and low electrical resistance across the contacts when they are closed and touching. Sufficient resistance to arcing and contact welding is also part of the design process, but is usually only considered in relation to what is deemed a reasonable current and/or voltage limit that is appropriate for the intended application. Typically, the contacts are in the shape of a section of a large radius sphere. Think of two very large beach balls touching. This means that the contacts touch each other at a single point. After enough usage this point will flatten out somewhat to a small flat area due to mechanical deformation from the contacts striking each other as they close. If arcing has occurred that flat area may be pitted and somewhat irregular depending on the usage history.

Figure 8A:
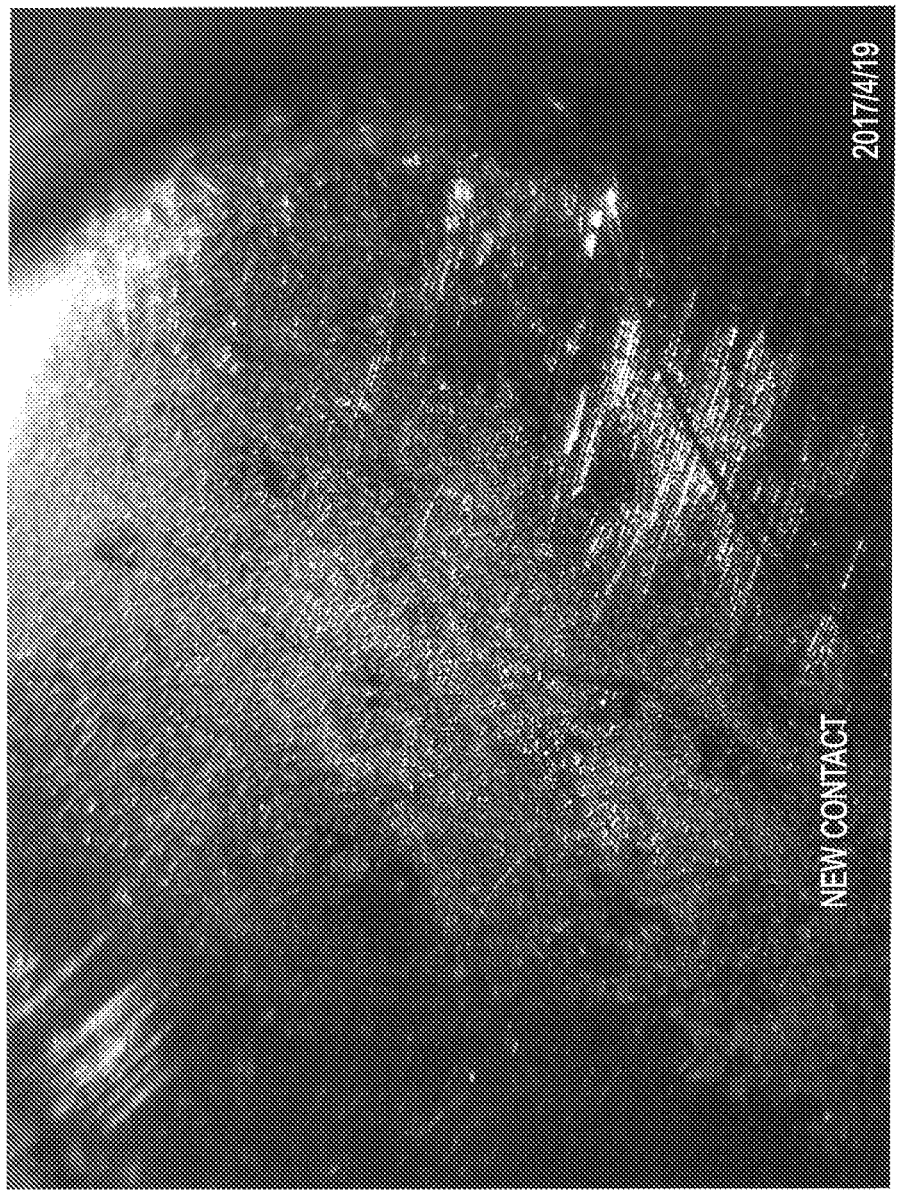
FIGS. 8A-8C are photographs sharing a contact surface without conditioning and with different numbers of conditioning cycles in accordance with the present invention.
Figure 8B:
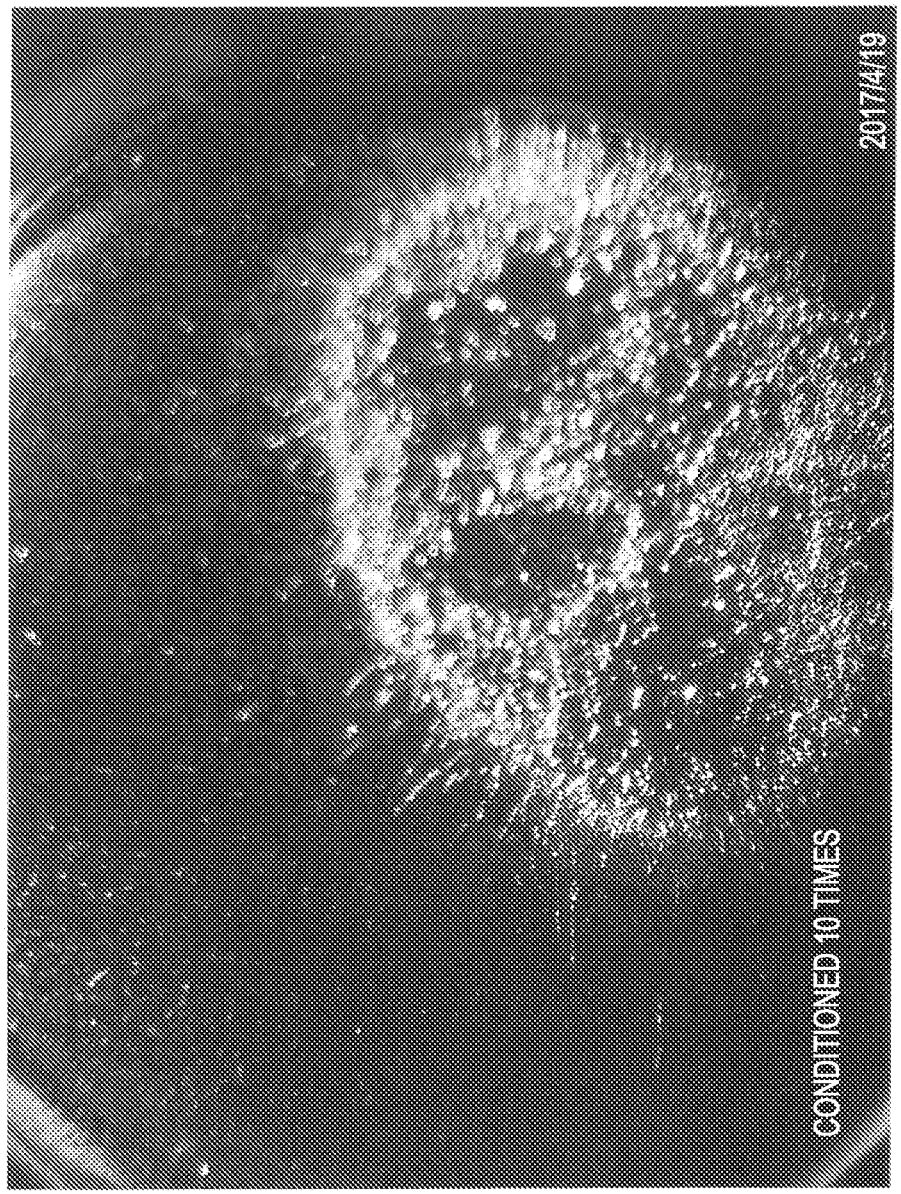
Figure 8C:
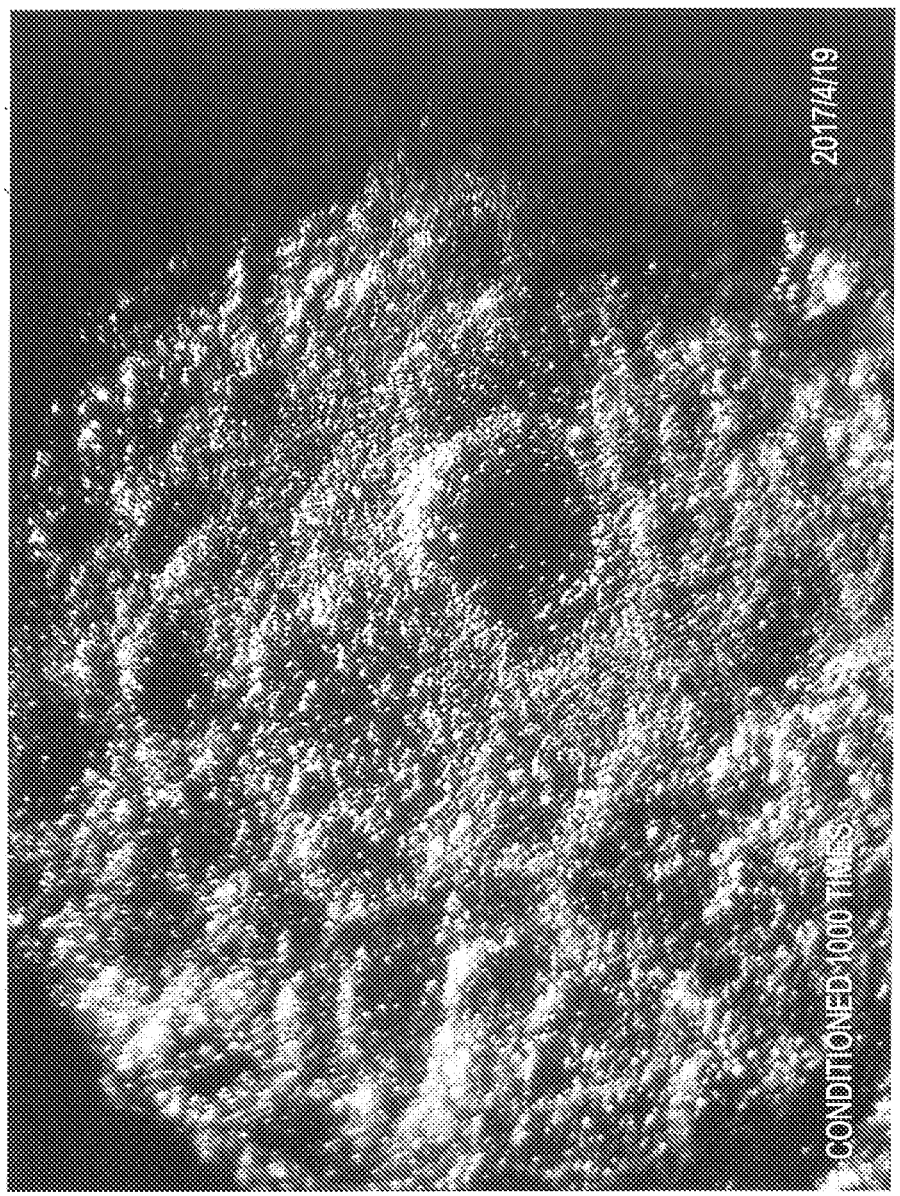

When contacts are new, they usually have the maximum vulnerability to point micro welding. This can be understood by considering how lightning strikes the earth. If a high point exists then lightning often will tend to strike that point in that one place. This is because that is the shortest path through what is a mostly uniform insulator, air. If lightning strikes an area where there are several points that are of the same height, then it will often split into multiple paths just before striking the ground and hit multiple points. This lowers the maximum energy each of those points experiences. This is exactly what happens when general purpose relays undergo the conditioning process. FIGS. 8A-8C show micro-photographs of an unused relay contact (FIG. 8A), one that has had 10 relay conditioning cycles on a relay conditioning apparatus (FIG. 8B), and one that has had 100 relay conditioning cycles on the apparatus (FIG. 8C). The effect is to increase the number of points that are very close in height on the contacts, which will then spread out the arc among those points, and reduce the current density at any given point, in a way that is similar to what occurs with lightning strike arcs as described above. Thus, in this case, both the shape (flattened) and the texture (roughened) are modified by the electromechanical conditioning process. This conditioning does lower the effective lifetime of the relay somewhat, but for ATS use, especially in data centers with controlled power quality, the reduction does not matter. This is because the number of times the ATS will cycle is usually quite low. A typical data center only does maintenance cycles that require ATS transfers from 3-24 times per year. The ATS unit will generally wear out due to other electrical component failure before the relay fails. A general purpose relay is often rated to 100*k* cycles, which shows that it will not be the component that fails first in typical data center or many other types of use, even if its service lifetime is significantly reduced by the relay conditioning process.

It is possible to manufacture relays with contact shapes that are more resistant to point micro-welding and arcing. This can be done by shaping the area of the contact that is designed to touch as a flat plateau with a set of high points of equal height. This can be done during the manufacturing of the contact or by stamping the contact into the desired shape after manufacture in a general purpose spherical shape. The contact material and plating can also be optimized to increase resistance to point micro-welding. The variety of methods described in the present invention allow the manufacturers of the contact and/or the OEM ATS or other equipment manufacturers to optimize the cost and contact characteristics to match the requirements of the intended application while allowing the contacts to be made and purchased economically. Zonit for example conditions general purpose relays because custom contacts would be much more expensive, due to insufficient volume.

Figure 10A:
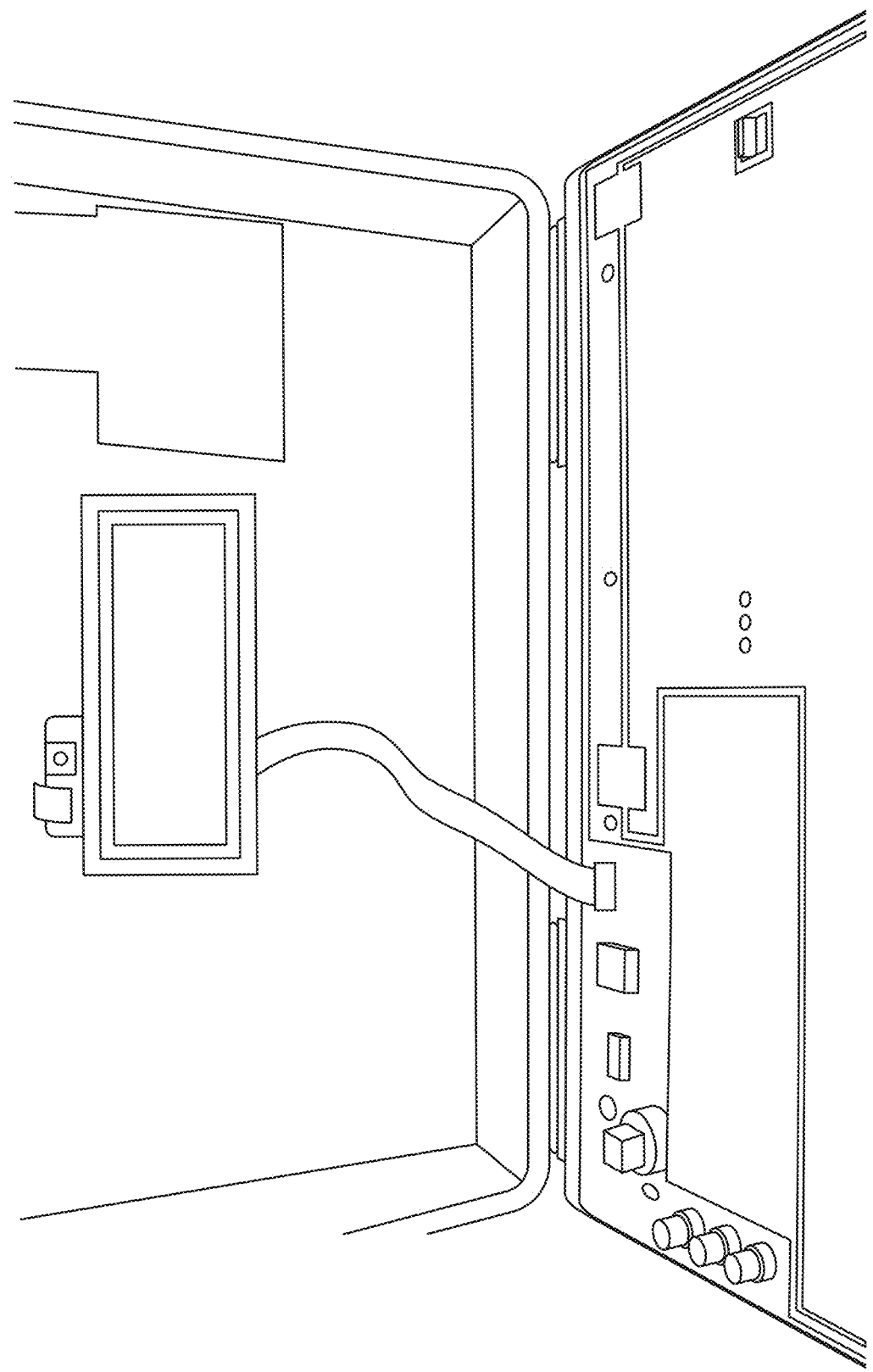
Figure 10B:
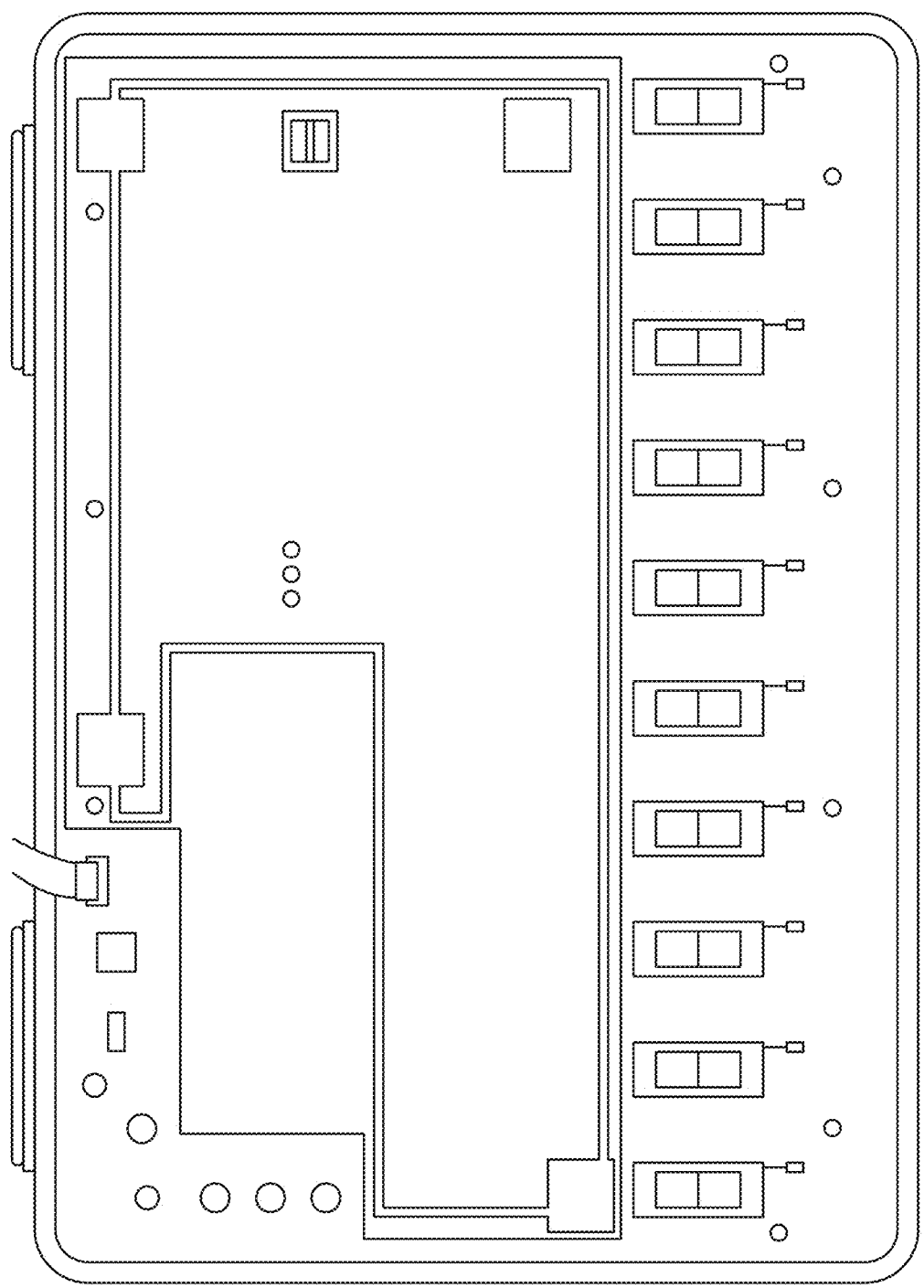

FIG. 9 shows one implementation of the relay conditioning circuit. FIGS. 10A-10C show photographs of the relay conditioning circuit. It will be appreciated that any signal source that provides signals sufficient to produce the desired changes in morphology, taking into account the specific design of the contact surface at issue and the expected operating environment of the contact surface, may be employed. The illustrated relay conditioning circuit, and a method of operating the circuit as described below have a couple of characteristics of particular note relating to optionally incrementally increasing the effective conditioning signal and sorting relays based on response time.

If the conditioning is implemented by way of a series of conditioning signal cycles, the contact surface will become progressively more conditioned with each such cycle as generally shown in FIGS. 8A-8C. For applications where the failure rate, even under the worst expected surge conditions, is low, it may be practical to simply apply surge signals in a series of cycles, where each surge signal matches the worst condition expected in the field. However, if the failure rate is higher, applying signals matching the worst expected conditions may result in an unacceptably high rate of waste associated with conditioning. Accordingly, in such cases, it may be useful to implement the conditioning process as a series of signal cycles of increasing effective power such that the earlier, lower power signal cycles have a lower probability of microwelding the surface to the point where it sticks, and later, higher power signal cycles fully condition the contact surface so that it is inoculated against the largest surges that are likely to occur in the field.

The illustrated conditioning circuit imitates the surge conditions anticipated in the field relating to a discharge surge from a charged capacitor against an AC signal. In the field, the largest power surge condition expected occurs when the discharge is timed to coincide with a point on the AC signal that is 180° out of phase with the surge voltage, whereas a discharge event occurring at a point where the AC signal is nearly in phase with the surge voltage will result in a relatively harmless surge.

The illustrated conditioning circuit employs a single set of discharge parameters, in terms of voltage and capacitance. In the case where progressively increasing power conditioning signals are desired, the conditioning circuit can be set to progressively vary the timing in relation to the AC signal from close to a matching voltage (deemed a phase angle of) 0° to the greatest voltage difference (deemed a phase angle of 180°). It will be appreciated that progressive conditioning could be accomplished with other circuits for applying an appropriate series of signal cycles. Moreover, the specific parameters (e.g., surge voltage, capacitance, AC signal voltage, number of cycles, phase difference between cycles) involve details of the specific application and trade-offs, e.g., between optimal conditioning and degradation of shelf life. It is been found, however, that a surge voltage of 300-400V, e.g., 339V, and a capacitance of 3 micro-farads against an AC signal of 240 V is effective to condition ATS relay contact surfaces for use in typical datacenter environments. In the ATS applications noted above, progressively increasing the phase angle has been found unnecessary. The surge signals are thus timed to be applied at a 180° phase angle and this process (cycle) is repeated, for example, 16 times. For cases with a higher failure rate, the phase angle could be increased from a small phase angle (e.g., 30°) to 180° over several cycles, followed by multiple cycles at the 180° phase angle, for example.

An additional feature of the invention is a method to measure, grade and group contacts based on their transfer time. General purpose contacts can vary significantly in their actuation time to open or close. This can be very important in ATS design, where you need to carefully control the movements and sequencing of one or more relays as part of how the ATS functions. There are a number of ways to deal with this issue, some of which are described in the other filings that are incorporated by reference. This invention adds another method to deal with this issue.

The relay actuation time variance may be too great to allow the precisely controlled movements of the relay set to achieve the required ATS transfer time. So, relay sorting is a method that allows the ATS to transfer fast enough to meet the intended design requirements at lower cost. The ATS can be designed to not have to measure and compensate for relay actuation time variations, which saves complexity and expense.

In one instantiation of the invention, the relay conditioning function can be combined with measurement of each individual relays actuation time. The relays can then be grouped together into sets, where every relay in the set falls within a required high-low range of actuation time. Further another apparatus can be provided that sorts the relays to be used in an ATS from slowest to fastest actuation speed. Each relay in the set used in one ATS unit can then be installed into specific locations in the ATS unit being constructed. This is because an ATS can be designed such that the relationship between the members of the set of relays it uses can benefit by this actuation speed sorting. This can further increase relay control accuracy and thus ATS transfer speed and reliability.

In another instantiation, the relay conditioning function can be performed on relays that are already installed in a working ATS unit. In this case, the apparatus is relatively simple, it consists of one or more plugstrips and an attached bank of capacitors to create a transient current of the desired value across the contacts in the relay when the connected ATS transfers. Additional devices such as a current interrupter switch controlled by a signal generator that can vary the time between control signals can be used to automate the test cycle by forcing the connected ATS to auto-switch as the power on the preferred side of the ATS is interrupted by the action of the signal generator combined with the current interrupter switch. The conditioning cycle can be repeated as many times as is deemed necessary and/or optimal.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An automatic transfer switch system, comprising;
   a switch unit having:
      a first input for receiving a first power signal via a first power cord extending between said switch unit and a first power outlet associated with a first power source;
      a second input for receiving a second power signal via a second power cord extending between said switch unit and a second power outlet associated with a second power source different than the first power source;
      an output for providing a power signal to a connected load;
      a switch for selectively connecting one of said first and second inputs to said output depending on a power signal status of at least one of said first and second power signals; and
      a power surge suppression circuit for suppressing power surges at said switch unit, wherein:
      said power surge suppression circuit is disposed at one of: 1) between said switch unit and one of said first and second power outlets, and 2) between switch unit and said connected load; and
      the power surge suppression circuit is configured to suppress the power surges associated with the switch unit switching between the first power source and the second power source.

2. The switch system of claim 1, wherein each of said first and second power cords includes a first end for connecting to said switch unit and a second end for connecting to one of said first and second power cords, and said power surge suppression circuit is disposed in-line on one of said first and second power cords between said first and second ends.

3. The switch system of claim 1, wherein said switch unit is configured such that said first power source is a primary power source of said switch unit and said power surge suppression circuit is disposed between said switch unit and said second power outlet.

4. The switch system of claim 1, wherein at least one of said first and second power outlets is an outlet of a power strip.

5. The switch system of claim 1, wherein said switch unit is operative for switching from a first state, wherein said first input is connected to said output, and a second state, wherein said second input is connected to said output, in response to detecting one of a power outage and a degradation of said first power signal from said first power source.

6. The switch system of claim 1, wherein said switch compromises a first electromechanical relay.

7. The switch system of claim 1, wherein said switch compromises a solid-state switch.

8. The switch system of claim 1, when said switch unit and said power surge suppression circuit are disposed in a switch housing.

9. A method for use in manufacturing an automatic transfer switch;
comprising;
providing an automatic transfer switch system, comprising;
1) A switch unit having a first input for receiving a first power signal via a first power cord extending between said switch unit and a first power outlet associated with a first power source, a second input for receiving a second power signal via a second power cord extending between said switch unit and a second power outlet associated with a second power source different than the first power source, an output for providing a power signal to a connected load, and a switch for selectively connecting one of said first and second inputs to said output depending on a power signal status of at least one of said first and second power signals; and
2) a power surge suppression circuit for suppressing power surges at said switch unit:
disposing said power surge suppression circuit at one of: 1) between said switch unit and one of said first and second power outlets, and 2) between said switch unit and said connected load, wherein said switch unit compromises an electromechanical relay having a contact surface for making an electrical contact between an armature of said electromechanical relay and a connected circuit; and
applying an electrical signal to said contact surface; and
suppressing the power surges associated with the switch unit switching between the first power source and the second power source.

10. The method of claim 9, wherein each of said first and second power cords includes a first end for connecting to said switch unit and a second end for connecting to one of said first and second power cords, and said method further comprises disposing said power surge suppression circuit in-line on one of said first and second power cords between said first and second ends.

11. The method of claim 9, wherein said switch unit is configured such that said first power source is a primary power source of said switch unit and said method further comprises disposing said power surge suppression circuit between said switch unit and said second power outlet.

12. The method of claim 9, wherein at least one of said first and second power outlets is an outlet of a power strip.

13. The method of claim 9, wherein said switch unit is operative for switching from a first state, wherein said first input is connected to said output, and a second state, wherein said second input is connected to said output, in response to detecting one of a power outage and a degradation of said first power signal from said first power source.

14. The method of claim 9, wherein said switch compromises a first electromechanical relay.

15. The method of claim 9, wherein said switch compromises a solid-state switch.

16. The method of claim 9, when said switch unit and said power surge suppression circuit are disposed in a switch housing of said switch unit.

* * * * *